(12) United States Patent
Zheng et al.

(10) Patent No.: US 12,469,850 B2
(45) Date of Patent: Nov. 11, 2025

(54) PHOSPHORUS-CARBON CATHODE MATERIAL BASED ON RED PHOSPHORUS AND PREPARATION METHOD THEREOF

(71) Applicant: HUBEI THREE GORGES LABORATORY, Hubei (CN)

(72) Inventors: Lei Zheng, Hubei (CN); Xiaofei Gong, Hubei (CN); Weiyun Shen, Hubei (CN); Huijuan Ma, Hubei (CN); Benjun Xi, Hubei (CN); Baorui Luo, Hubei (CN); Ruan Chi, Hubei (CN)

(73) Assignee: HUBEI THREE GORGES LABORATORY (CN)

( * ) Notice: Subject to any disclaimer, the term of this patent is extended or adjusted under 35 U.S.C. 154(b) by 0 days.

(21) Appl. No.: 18/631,592

(22) Filed: Apr. 10, 2024

(65) Prior Publication Data
US 2024/0258523 A1 Aug. 1, 2024

Related U.S. Application Data

(63) Continuation of application No. PCT/CN2023/107270, filed on Jul. 13, 2023.

(30) Foreign Application Priority Data

Oct. 25, 2022 (CN) .......................... 202211312036.4

(51) Int. Cl.
*H01B 1/06* (2006.01)
*H01M 4/04* (2006.01)
*H01M 4/587* (2010.01)

(52) U.S. Cl.
CPC .............. *H01M 4/587* (2013.01); *H01B 1/06* (2013.01)

(58) Field of Classification Search
CPC .. H01B 1/00; H01B 1/04; H01B 1/06; H01M 4/04; H01M 4/06; C01B 32/15
See application file for complete search history.

(56) References Cited

U.S. PATENT DOCUMENTS 11,923,527 B2 * 3/2024 Xu .................... H01M 4/131
2025/0158030 A1 * 5/2025 Abe .................... H01M 4/366

FOREIGN PATENT DOCUMENTS

| CN | 105702939 A | 6/2016 |
| CN | 108899528 A | 11/2018 |

(Continued)

OTHER PUBLICATIONS

Liu et al "Encapsulating Red Phosphorus in Ultralarge Pore Volume Hierarchical Porous Carbon Nanospheres for Lithium/Sodium-Ion Half/Full Batteries", ACS Nano 2019, 13, 13513-13523.*

(Continued)

*Primary Examiner* — Mark Kopec

(57) ABSTRACT

A new phosphorus-carbon negative electrode material based on red phosphorus and a preparation method thereof are disclosed. The material comprises red phosphorus and composite carbon nanospheres. The red phosphorus and the composite carbon nanospheres are mixed in a solvent and experience a thermal reaction to give a product, wherein a mass concentration of the composite carbon nanospheres in the solution is 10%-20%. The half-cell assembled by using the phosphorus-carbon composite material still maintains a low overpotential at a high current density of 2.5 mA·cm$^{-2}$, and the capacity retention rate after 150 cycles still reaches 85%.

9 Claims, 17 Drawing Sheets

(56) References Cited

FOREIGN PATENT DOCUMENTS

| | | | | |
|---|---|---|---|---|
| CN | 109148870 A | | 1/2019 | |
| CN | 109309199 A | * | 2/2019 | ............ B82Y 30/00 |
| CN | 113264519 A | | 8/2021 | |
| CN | 115621445 A | | 1/2023 | |
| JP | 2009184861 A | | 8/2009 | |

OTHER PUBLICATIONS

Liu et al "Encapsulation of Red Phosphorus in Carbon Nanocages with Ultrahigh Content for High-Capacity and Long Cycle Life Sodium-Ion Batteries", ACS Nano 2021, 15, 5679-5688.*

Jin et al "Tailoring conductive networks within hollow carbon nanospheres to host phosphorus for advanced sodium ion batteries", Nano Energy 70 (2020) 104569.*

Zhu et al "Green, Template-Less Synthesis of Honeycomb-like Porous Micron-Sized Red Phosphorus for High-Performance Lithium Storage", ACS Nano 2021, 15, 1880-1892.*

International Search Report of PCT/CN2023/107270 (Mail Date Oct. 2023).

Written Opinion of PCT/CN2023/107270 (Mail Date Oct. 2023).

* cited by examiner

PHOSPHORUS-CARBON CATHODE MATERIAL BASED ON RED PHOSPHORUS AND PREPARATION METHOD THEREOF

CROSS-REFERENCE TO RELATED APPLICATIONS

This Application is a bypass continuation application of PCT/CN2023/107270. This application claims priorities from PCT Application No. PCT/CN2023/107270, filed Jul. 13, 2023, and from the Chinese patent application 202211312036.4 filed Oct. 25, 2022, the content of which are incorporated herein in the entirety by reference.

TECHNICAL FIELD

The present disclosure specifically relates to a method of preparing a phosphorus-carbon composite negative electrode based on carbon nanotubes doped with red phosphorus. The present disclosure achieves preparing a phosphorus-carbon composite negative electrode having a high reversible specific capacity and a good rate performance by way of compounding red phosphorus with low melting transition metal compounds embedded in a carbon nanosphere, favoring further achievement to a new commercial lithium-ion battery system having a high energy density, a high-rate performance and low costs. The present disclosure belongs to a subfield of lithium-ion battery negative electrodes in the technical field of lithium battery materials for new energy.

BACKGROUND

Under the current global dual-carbon background called "carbon peak" and "carbon neutrality", lithium-ion batteries are expected to be widely used in application markets of consumption, power and energy storage, but more opportunities also mean more challenges. As the lithium-ion batteries are flourishingly developing in new energy vehicles, mobile devices and other fields, people have also put forward higher requirements for energy density and high-rate performance of lithium-ion battery systems. At present, a carbon-based negative electrode prevails in conventional commercial negative electrode materials (such as a most conventional and widely used graphite cathode), and lithium intercalation/de-lithiation with layered structures achieve a good cycling performance, but they also result in the disadvantages of low theoretical specific capacity (372 $mA·h·g^{-1}$) and poor high-rate charging-discharging performance. On the contrary, among many negative electrode material systems, a phosphorus-based negative electrode has advantages of high theoretical specific capacity (e.g., Li3P, 2596 $mA·h·g^{-1}$), excellent rate performance and relatively-low costs, becoming one of the research directions that are expected to further achieve a high energy density and a high-rate performance in future. However, of phosphorus-based materials the conductivity is poor and the volume expansion is large during cycling (the volume expansion rate is up to 300%), thus the cycling performance of materials needs to be further optimized and improved, greatly limiting the application of phosphorus-based negative electrode materials in lithium-ion batteries.

In order to solve this problem, a phosphorus-carbon composite negative electrode is expected to combine the advantages of phosphorus-based and carbon-based materials to achieve a higher energy density and a better rate performance under the synergistic effect of a phosphorus-based material and a multi-dimensional carbon material. Among many carbon-based materials, carbon nanotubes can form a 3D skeleton structure, which can effectively solve the problems such as volume expansion of the phosphorus-based negative electrode. CN109309199 disclosed a method of preparing a red phosphorus/carbon nanotube composite material for negative electrodes of lithium-ion batteries. In this method, the difference in surface electronegativity of red phosphorus and carbon nanotubes in a solvent enables the red phosphorus to be uniformly adsorbed on the wall of the carbon nanotubes by means of a low-temperature liquid phase method, so as give a uniform red phosphorus/carbon nanotube composite material. The preparation method is simple and environmentally friendly, and the obtained materials significantly improve the specific capacity and cyclic charging-discharging stability of lithium-ion batteries. In CN11769271, large-spacing MXene and red phosphorus are mixed with each other and roasted at high temperature, to give a MXene/red phosphorus composite negative electrode material having a high capacity and a high cycling performance; based on the high theoretical specific capacity of red phosphorus, the composite material makes full use of the advantages of the large-spacing MXene such as high electronic conductivity, large specific surface areas, high strength in mechanical performance, modifiability of surfaces and uniqueness of layered structures, so as to improve the conductivity and structural stability of red phosphorus as an ideal carbon carrier. CN112420999 disclosed a phosphorus-carbon composite material having a core-shell coating structure, which includes a phosphorus-based material core body and a carbon-based material coating layer; this structure not only alleviates volume expansion during a charging-discharging process, but also prevents lithium phosphide from dissolving out and a side reaction between an electrode interface and an electrolyte during a charging-discharging cycle of a lithium battery, so as to have a good charging-discharging specific capacity and a cycling performance. CN114122386 disclosed an active precursor material of a tin phosphide@carbon composite negative electrode, which includes a carbon skeleton and tin phosphide nanoparticles embedded in its outer surface and distributed in a dotted pattern. In CN109309, tin phosphide nanodots uniformly diffusely distributed on the outer surface of a carbon skeleton effectively decrease a local current density and achieve a more uniform lithium deposition and dissolution in a cycle process, based on the innovative morphology and structural characteristics and combined with the rich specific surface area and good conductivity of the skeleton carbon.

SUMMARY

An objective of this present disclosure is to claim a method of preparing a high-performance phosphorus-carbon composite negative electrode based on a carbon nanosphere embedded and doped with red phosphorus and internal low-melting transition metal compounds through low-temperature liquid phase immersion.

Of a simple phosphorus-based negative electrode material the conductivity is poor (the conductivity of red phosphorus is only $10^{-14}$ $S·cm^{-1}$), and the redox kinetics is slow in the process of lithium intercalation/de-lithiation, resulting in serious internal polarization in a battery, thus thickening a SEI film leads to serious loss of lithium ions; furthermore a huge volume expansion (a volume expansion rate is up to 300%) in the process of a charging-discharging cycle makes it easy to cause pulverization of active materials, which seriously affects the coulombic efficiency and rate cycling performance of materials.

Of a single carbon-based negative electrode material the theoretical specific capacity is low (372 mA·h·g$^{-1}$), and the lithium ion diffusion rate and diffusion channel are limited in a charging-discharging process at high-current, resulting in a slow rate of lithium intercalation/de-lithiation; furthermore, in the intercalation process, a compound Li$_x$C$_6$ will be formed between graphite carbon layers, thus it will increase the spacing of the carbon layers, thereby easily causing the carbon layers to fall off and reducing the capacity, cycle performance and service life of the carbon-based negative electrode material.

Of an existing phosphorus-carbon composite negative electrode material the stable chemical bond connect a carbon carrier with a phosphorus active component, and the carbon material has a high conductivity, a large specific surface area and a flexible surface that are easy to form a conductive network, which promotes the uniform dispersion of the active component meanwhile absorbs the mechanical stress generated in a process of volume changes, prevents the phosphorus active component from pulverization, and improves its rate performance and cycle stability. However, at present, the phosphorus-carbon composite negative electrode generally has problems such as interface instability and poor wettability to lithium metal.

GASIFICATION CONDENSATION PROCESS: making use of the sublimation point of red phosphorus higher than 450° C. enables the red phosphorus vapor to be evenly deposited on the wall of the carbon nanotube under capillary force and pressure difference, and then to be adsorbed and deposited on the inner surface of the carbon nanotube after cooling. Its disadvantage is that the amount of phosphorus deposited on the conductive carbon frame through a gasification condensation process is limited, but the amount of deposited phosphorus is an important factor affecting the capacity performance of a battery. In addition, the white phosphorus easily formed as a by-product in the process of cooling is flammable and dangerous somewhat, but removing the white phosphorus needs to use toxic reagents such as carbon disulfide, which have great potential safety hazards.

HIGH-TEMPERATURE PYROLYSIS PROCESS: using a phosphorus material as a substrate, then performing high-temperature pyrolysis on an organic substance in an inert atmosphere to produce amorphous carbon as a carbon source used to coat the phosphorus material. However, the phosphorus in the composite material prepared through the high-temperature pyrolysis process acting as a core has poor dispersion, meanwhile the carbon layer produced by the pyrolysis of the organic substance is prone to uneven distribution, and the agglomeration between particles is serious when the pyrolysis temperature is slightly higher.

CARBOTHERMAL REDUCTION PROCESS: at a certain temperature, inorganic carbon is used as a reducing agent to reduce phosphide to prepare a phosphorus-carbon composite. Its disadvantages lie in difficulty of controlling the reduction process, high requirements for the precision of a phosphorus-carbon ratio, as well as high possibility of producing impurities, difficulty of controlling product quality, inconsistence in the size of particles, and poor dispersion.

Based on the above related technical means, SnS$_2$ and other similar intermediate products inside the carbon nanosphere have been introduced to improve the performance of the phosphorus-carbon composite negative electrode through low-temperature liquid phase immersion. Firstly, the ability to effectively reduce the formation of white phosphorus by-products by controlling temperature and atmosphere makes it achievable to effectively decrease the manufacturing costs and improve the safety of a preparation process. Secondly, the formation of solid solutions such as lithium and tin in the carbon nanosphere via a first charging-discharging process improves the wettability to the lithium metal in a cycle exerted by the phosphorus-carbon composite sphere; furthermore, SnS$_2$ and other analogues can be precisely adjusted into a nanosheet structure having highly-exposed active sites, which are exposed to molten lithium metal at a high temperature to easily form evenly-distributed alloy sites. Thirdly, a potential difference of about 0.3 V exists between the formed alloys such as lithium-tin and lithium metal, thus providing a driving force for lithium diffusion, furthermore, the low deposition overpotential of the lithium metal on the tin helps the lithium metal to immerse in the phosphorus-carbon composite microsphere, so that the specific capacity of the phosphorus-carbon negative electrode in the first charging process increases by 30% or more. Fourthly, the lithium-tin alloy has a relatively high chemical potential, so it is less likely to have a side reaction with a liquid electrolyte than a pure lithium metal or a phosphorus-carbon negative electrode, thus guaranteeing less electrolyte consumption and longer cycle life.

In view of the above-mentioned technical problems, the present disclosure provides a phosphorus-carbon composite negative electrode material based on carbon nanotubes doped with red phosphorus, including red phosphorus and composite carbon nanospheres.

Further, a mass ratio of the red phosphorus to the composite carbon nanospheres is 1:1-3:1.

Further, the red phosphorus and the composite carbon nanospheres are mixed in a solvent and experience a thermal reaction to give a product, wherein a mass concentration of the composite carbon nanospheres in the solution is 10%-20%.

The small size red phosphorus particles of the present disclosure are uniformly compounded on the carbon nanotube microsphere having a 3D porous skeleton, which prevents a large number of red phosphorus particles from agglomerating, improves the conductivity of the red phosphorus material, and effectively solves the problem of volume expansion in a charging-discharging process. The red phosphorus may be in a form of a 60-100 mesh powder or a 10-20 mesh microsphere particle.

Further, the solvent in the thermal reaction comprises at least one of deionized water, absolute ethanol, anhydrous methanol and anhydrous ether.

Further, a low-melting transition metal compound (≤200° C.) is embedded and performs doping inside the composite carbon nanosphere; a mass concentration of the low-melting transition metal compound is 0.2-3%.

The low-melting transition metal compound intermediates embedded in the carbon nanotube help lithium to be evenly immersed in the internal channels of the carbon nanosphere, significantly enhancing the specific capacity and rate performance of the phosphorus-carbon composite negative electrode material (the specific capacity on firstly charging increases by 30% or more), meanwhile avoiding the lithium metal from depositing on the electrode surface and reacting with the electrolyte, so it can improve the cycling performance of the material.

Further, the low melting point transition metal compound is obtained by making a metal source of tin, titanium, cadmium, iron, cobalt, chromium, manganese, germanium, or nickel react with a non-metal source, and a molar ratio of the non-metal source to the metal source is 1.1-3:1.

Further, the metal source comprises fluoride, chloride, nitrate, sulfate and carbonate of tin, titanium, cadmium, iron, cobalt, chromium, manganese, germanium, and nickel; the non-metal source comprises any one or more of sulfide, selenide, telluride and phosphide; the sulfide comprises at least one of sublimated sulfur, thioacetamide and thiourea; the selenide comprises at least one of elemental selenium powder and sodium selenite; the telluride comprises at least one of elemental tellurium powder and sodium tellurate; the phosphide comprises at least one of sodium hypophosphite, phosphoric acid, ammonium dihydrogen phosphate and diammonium hydrogen phosphate.

Further, the method includes, but is not limited to, $Fe_2S_3$, $GeS_2$, $SnS_2$, $Co_9S_8$, NiSe, $SnTe_2$, TiP and the likes.

Further, a precursor of the carbon nanosphere is any one of carbon nanofiber, carbon nanotube, mesoporous carbon, porous carbon, commonly-used conductive agent carbon black and Super P.

Further, the carbon nanosphere may be a material different in particle sizes and skeleton structures obtained through any one or more of surface modification processes of amination, carboxylation, hydroxylation, phosphorization and graphitization.

The 3D porous skeleton of the carbon nanotubes modified on their surface can enhance their strength in compounding with low melting transition metal compounds and red phosphorus, avoid SEI films from consuming lithium ions, reduce the occurrence of a side reaction, and improve the reversible charging-discharging performance and cycling stability of the phosphorus-carbon composite negative electrode material.

The phosphorus-carbon composite negative electrode prepared based on the carbon nanospheres doped with red phosphorus has good morphological and structural stability due to strong force between each component, and can maintain a basic morphological structure after multiple charging-discharging cycles at a high current density, avoiding the problem of lithium precipitation caused by structural collapse.

In a second aspect of the present disclosure, a method of preparing the phosphorus-carbon composite negative electrode material based on carbon nanotubes doped with red phosphorus is provided, wherein the preparation process of low melting transition metal compound intermediates based on a liquid phase method is simple and easy to operate, and the prepared intermediate material is uniform in morphology, small in particle size and conducive to doping in a subsequent carbon nanosphere. The method includes the steps of (1) preparing a low melting transition metal compound intermediate solution: a metal source and a non-metal source being dissolved in a solvent and hydrothermally reacting with the solvent to give a low melting point transition metal compound intermediate solution;

(2) preparing composite carbon nanospheres: carbon nanospheres being dispersed in the low melting point transition metal compound intermediate solution and hydrothermally reacting with the solvent to execute solid liquid separation, then a filter cake being dried to give a composite carbon nanosphere powder material: thus the low-melting transition metal compound intermediate being introduced into the carbon nanosphere, on the one hand, phosphorus and carbon materials getting better compounded, and on the other hand, the fact of phosphorus and carbon materials being alloyed with lithium metal and introduced into the internal channel of the carbon nanosphere, preventing deposition on the outer surface of the carbon nanosphere and reaction with the electrolyte, meanwhile improving the specific capacity and rate performance of the material;

(3) preparing a red phosphorus dispersion liquid: red phosphorus being ball-milled, then put into a hydrothermal treatment process, thus a dried solid substance being dispersed in a solvent to give a uniform red phosphorus dispersion liquid, and (4) preparing a phosphorus-carbon composite negative electrode material. the composite carbon nanosphere powder material being ultrasonically dispersed in a solvent, then the red phosphorus dispersion liquid being added, and hydrothermally reacting with the solvent after ultrasonic treatment, then a solid substance being collected and freeze-dried after centrifugated and washed to give a phosphorus-carbon composite negative electrode material.

The introduction of a liquid phase and a melt phase in the process of the present disclosure is conducive to better achievement of uniformly compounding phosphorus with carbon, raising the bonding strength between various components, enhancing the structural stability of materials, and improving the cycling performance of the phosphorus-carbon composite negative electrode material.

Preferably, in the step (1), the metal source comprises any one of fluoride, chloride, nitrate, sulfate and carbonate of tin, titanium, cadmium, iron, cobalt, chromium, manganese, germanium, and nickel.

Preferably, the non-metal source comprises one of sulfide, selenide, telluride and phosphide; the sulfide comprises at least one of sublimated sulfur, thioacetamide and thiourea; the selenide comprises at least one of elemental selenium powder and sodium selenite; the telluride comprises at least one of elemental tellurium powder and sodium tellurate; the phosphide comprises at least one of sodium hypophosphite, phosphoric acid, ammonium dihydrogen phosphate and diammonium hydrogen phosphate.

Preferably, the method includes, but is not limited to, $Fe_2S_3$, $GeS_2$, $SnS_2$, $Co_9S_8$, NiSe, $SnTe_2$, TiP and the likes.

Preferably, a molar ratio of the non-metal source to the metal source is 1:1-3:1.

Preferably, the solvent comprises at least one of deionized water, absolute ethanol, anhydrous methanol and anhydrous ether.

Preferably, a mass concentration of the low melting transition metal compound intermediate is 0.2-3%.

Preferably, in the step of preparing a low melting transition metal compound intermediate solution, the hydrothermal reaction with the solvent goes at 50-100° C. for 5-50 mins while stirring magnetically at 300-2000 rpm.

Preferably, the carbon nanosphere may be a material different in particle sizes and skeleton structures obtained through any one or more of surface modification processes of amination, carboxylation, hydroxylation, phosphorization and graphitization.

Preferably, a mass ratio of the carbon nanosphere to the low melting transition metal compound intermediate is 1:1-3.1.

Preferably, in the step (2) of preparing a composite carbon nanosphere, the hydrothermal reaction with the solvent goes at 40-90° C. for 20-80 mins, and the solid-liquid separation is executed by means of suction filtration and washing, then the resultant filter cake is placed in a vacuum drying oven at 50-60° C. overnight.

Preferably, in the process of red phosphorus being ball-milled in the step (3), the red phosphorus and stainless-steel balls are put at a mass ratio of 1:10-1:50 into a stainless-steel ball tank, then ball-milled at a speed of 300-500 rpm for 1-5 h in a nitrogen atmosphere, and the hydrothermal treatment process goes at 150-200° C. for 10-12 h.

The strong and stable chemical bonds formed between the different components in the ball milling process is essential to achieve the high rate and cycling performance of the phosphorus-carbon composite material. However, In the process of compounding phosphorus with carbon through mechanical ball milling, it is not possible to guarantee the uniformity and consistency of the material and cause a serious agglomeration between particles, so it is difficult to establish a connection between the components through chemical bonding, and the ball milling will lead to damage to the 3D skeleton of the carbon nanotube, which is not conducive to restrain a volume expansion effect in the cycle. But, the present disclosure can effectively realize uniformly compounding materials in a form such as a liquid phase and a melt phase without damage to the 3D skeleton of the material.

Preferably, in the step (4), a mass concentration of the red phosphorus dispersion liquid is 10%-20%, a mass concentration of the composite carbon nanosphere powder material in the solution is 10%-20%, and a mass ratio of the red phosphorus to the composite carbon nanosphere powder material is 1:1-3:1.

Preferably. in the step (4), the hydrothermal reaction with the solvent goes at 150-500° C. for 20-60 mins.

In a third aspect of the present disclosure, an application of the prepared phosphorus-carbon composite negative electrode material based on carbon nanotubes doped with red phosphorus as a negative electrode of a lithium-ion battery is provided.

The present disclosure provides a battery assembled by using the phosphorus-carbon composite negative electrode material based on this doped structure.

The present disclosure provides an application of the composite negative electrode material in a high-capacity and high-rate lithium-ion battery system.

The assembly steps of the high-capacity and high-rate lithium-ion battery are as follows. Mixing the phosphorus-carbon composite negative electrode material prepared above with binders (PVDF) and acetylene black (AB) at a mass ratio of 8:1:1; mixing them evenly in a N-methyl pyrrolidone (NMP) solvent into paste then applying the paste on a copper foil; after vacuum drying the copper foil at 80° C., using a die-cut piece as a working electrode, and using a lithium metal piece as a counter electrode; assembling a button cell (half-cell) in an experimental electrolyte system of 1.0 M LiTFSI in DOL:DME(V:V=1:1)+1.0 wt % LiNO$_3$ and carrying out a charging-discharging cycle test.

The technical solution of the present disclosure has the following beneficial effects.

Improving safety: the introduction of the low melting point transition metal compound intermediate can effectively reduce the formation of by-product white phosphorus and effectively decrease the manufacturing costs and improve the safety of the preparation process.

Solving the problem of volume expansion. the 3D skeleton structure of carbon nanotubes effectively solves the problem of volume expansion in a charging-discharging process.

Improving the wettability of the phosphorus-carbon composite negative electrode processing the transition metal compound intermediate and the composite carbon nanosphere, and doping with red phosphorus all involve a liquid phase or a melt phase, which is conducive to uniformly compounding the materials. The good wettability maintains the graininess and electrode morphology of the composite negative electrode, and the electrode structure remains basically unchanged even after taking a high charging-discharging depth and a big number of cycles, so it avoids the lithium metal from depositing on the outer wall of the carbon skeleton and resulting in agglomeration of inactivated lithium or occurrence of dead lithium in the electrode.

Cost reduction. the process is simple and feasible with low costs and high safety, presenting a prospect of large-scale application.

Increasing specific capacity: a lower overpotential of Li$^+$ deposited on the tin is lower than that of the carbon material, and its lipophilicity helps to evenly immerse the molten metal lithium into the internal channel of the carbon nanosphere during a stirring process, so as to give a fuller and denser phosphorus-carbon composite microsphere particle, so that the specific capacity of the pretreated composite material on firstly charging increases by 30% or more.

Improving electrochemical stability: densely filling the composite material with lithium metal avoids a side reaction between lithium metal and electrolytes, and effectively improves the utilization rate of electrolytes and active lithium. The half-cell assembled by using the phosphorus-carbon composite material still maintains a low overpotential at a high current density of 2.5 mA·cm$^{-2}$, and the capacity retention rate after 150 cycles still reaches 85%, achieving a double breakthrough in the cycle life and the capacity retention rate of the phosphorus-carbon composite material.

BRIEF DESCRIPTION OF THE DRAWINGS

FIG. 8A shows Li$^+$ and Sn substrate, and FIG. 81 shows Li$^+$ and C substrate.

FIG. 9A is a SEM picture of the CNT material, FIG. 8B is a SEM picture of the P-CNT@Ni$_3$S$_4$ material.

FIG. 10A is a SEM picture of the CNT material, FIG. 10B is a SEM picture of the P-CNT@ CoSe$_2$ material.

FIG. 11A is a SEM pictures of the CNT material, FIG. 11B is a SEM picture of the P-CNT@ GeS$_2$ material.

FIG. 12A is a SEM picture of the material, FIG. 12B is a SEM picture of the P-CNT@ TiP material.

DETAILED DESCRIPTION OF SOME EMBODIMENTS

Explanation of Terms

Figure 1:
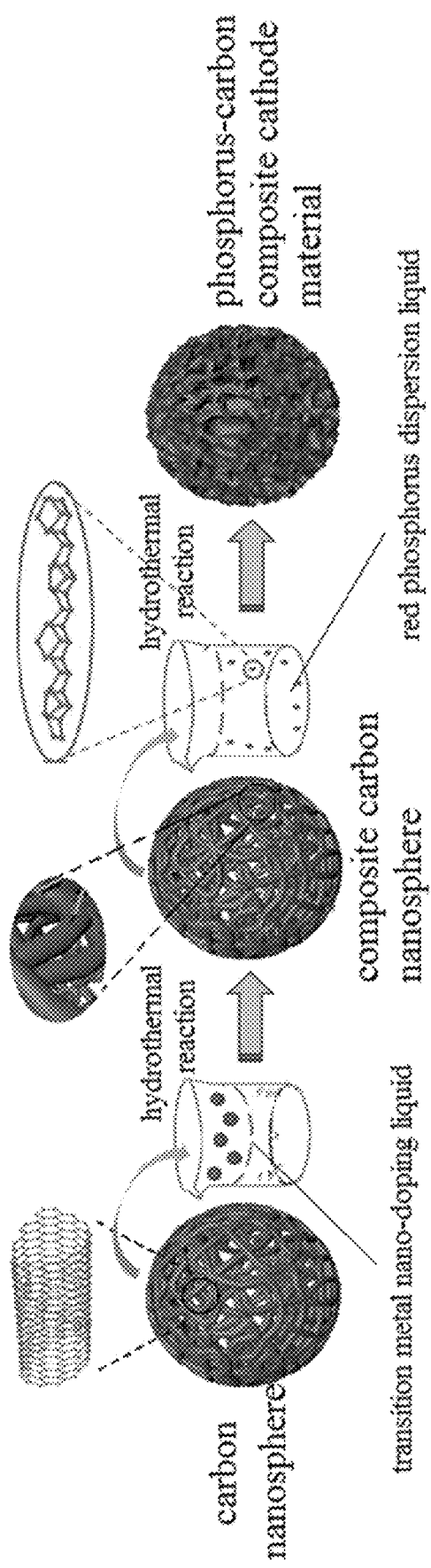
FIG. 1 shows the preparation of the phosphorus-carbon composite negative electrode material.

Phosphorus-based negative electrode. it has a high theoretical specific capacity and a good rate performance, and its theoretical lithium storage specific capacity is 2596 mA·h·g$^{-1}$ (Li$_3$P), as well as it has a high safe reaction electrode potential (0.8 V vs Li/Li$^+$); however, its conductivity is poor, and its volume change is large in a lithium deintercalation process, thus its volume expansion rate reaches 300%, resulting in necessity to improve cycle stability of materials, which greatly limits its application in lithium-ion batteries.

Carbon-based negative electrode: typical commercial electrodes, such as graphite, have advantages of low costs, simplicity and matureness in preparation processes, strong conductivity, low working voltage, good reversible charging-discharging performance, and strong safety, but have the disadvantages of low specific capacity (372 mA·h·g$^{-1}$), low coulombic efficiency and poor high-rate charging-discharging performance.

Phosphorus-carbon composite negative electrode: it is a new composite material using carbon as a dispersed matrix and phosphorus as an active substance, combining advantages of a phosphorus negative electrode with those of a carbon negative electrode. It has good conductivity, raises negative electrode conductivity, alleviates volume expansion of electrodes during cycling and then improves cycling stability. However, the composite negative electrode has a large space in its internal structure and its interior has poor wettability relative to lithium metal, therefore such disadvantages increase the contact area between the active lithium and the electrolyte to a certain extent. resulting in side reactions and reducing a first coulombic efficiency.

Energy density it refers to the amount of energy stored in a certain unit of space or mass of substances. The energy density of a battery refers to the amount of electrical energy emitted from a battery by an average unit volume or unit mass.

Rate performance. it refers to storing or releasing a certain amount of energy into or from a battery at a certain rate. This storage and release process is premised on controllability and safety that do not significantly affect battery life and other performances. Generally, we call a lithium battery discharging at 1.0 C as a standard battery, a lithium battery discharging at 2.0 C-10 C as a small-rate battery, and a lithium battery discharging at more than 10 C as a high-rate battery.

In the present disclosure, the diameter of the carbon nanotube is preferably 2-50 nm, more preferably 5-40 nm and 10-30 nm, most preferably 15-25 nm.

In the present disclosure, the length of the carbon nanotube is preferably 0.1-500 μm, more preferably 1-400 μm, 10-300 μm and 50-200 μm, and most preferably 100-150 μm. The present disclosure does pose a limitation on the source of the carbon nanotube, so it is possible to use the carbon nanotube that is well known to a person skilled in the art and can be purchased on the market.

In the present disclosure, the carbon nanotube is preferably a carboxylated carbon nanotube, an aminoated carbon nanotube, a hydroxylated carbon nanotube, a phosphorylated carbon nanotube, and a graphitized carbon nanotube. The present disclosure does not pose any special limitations on the source of the modified carbon nanotubes, and the modified carbon nanotubes that are well known to a person skilled in the art may be used, such as the carbon nanotubes having carboxyl groups commercially available may be used (purchased from Jiangsu Xianfeng Nanomaterials Technology Co., Ltd.). Besides the carbon nanotube may also be oxidized on its surface to give a carboxylated carbon nanotube. In the present disclosure, an oxidant for surface oxidation preferably includes sulfuric acid and nitric acid, and more preferably is a mixture of sulfuric acid and nitric acid.

An objective of this patent is to claim a method of preparing a high-performance phosphorus-carbon composite negative electrode based on a carbon nanosphere embedded and doped with red phosphorus and internal low-melting transition metal compounds through low-temperature liquid phase immersion.

A method of preparing a phosphorus-carbon composite negative electrode material, comprising the steps of.
(1) preparing a low melting transition metal compound intermediate solution: a metal source and a non-metal source being dissolved in a solvent and hydrothermally reacting with the solvent to give a low melting point transition metal compound intermediate solution;
(2) preparing a composite carbon nanosphere: a carbon nanosphere being dispersed in the low melting point transition metal compound intermediate solution and hydrothermally reacting with a solvent to execute solid-liquid separation. then a filter cake being dried to give a composite carbon nanosphere powder material;
(3) preparing a red phosphorus dispersion liquid red phosphorus being ball-milled, then put into a hydrothermal treatment process, thus a dried solid substance being dispersed in a solvent to give a uniform red phosphorus dispersion liquid; and
(4) preparing a phosphorus-carbon composite negative electrode material the composite carbon nanosphere powder material being ultrasonically dispersed in a solvent, then the red phosphorus dispersion liquid being added, and hydrothermally reacting with the solvent after ultrasonic treatment, then a solid substance being collected and freeze-dried after centrifugated and washed to give a phosphorus-carbon composite negative electrode material.

In the step (1), the metal source comprises any one of fluoride, chloride, nitrate, sulfate and carbonate of tin, titanium, cadmium, iron, cobalt, chromium, manganese, germanium, and nickel.

The non-metal source comprises one of sulfide, selenide, telluride and phosphide; the sulfide comprises at least one of sublimated sulfur, thioacetamide and thiourea; the selenide comprises at least one of elemental selenium powder and sodium selenite: the telluride comprises at least one of elemental tellurium powder and sodium tellurate; the phosphide comprises at least one of sodium hypophosphite, phosphoric acid, ammonium dihydrogen phosphate and diammonium hydrogen phosphate.

A molar ratio of the non-metal source to the metal source is 1:1-3:1.

The solvent comprises at least one of deionized water, absolute ethanol, anhydrous methanol and anhydrous ether.

A mass concentration of the low melting transition metal compound intermediate is 0.2-3%.

In the step of preparing a low melting transition metal compound intermediate solution, the hydrothermal reaction with the solvent goes at 50-100° C. for 5-50 mins while stirring magnetically at 300-2000 rpm.

A precursor of the carbon nanosphere is any one of carbon nanofiber, carbon nanotube, mesoporous carbon, porous carbon, commonly-used conductive agent carbon black and Super P.

The carbon nanosphere may be a material different in particle sizes and skeleton structures obtained through any one or more of surface modification processes of amination, carboxylation, hydroxylation, phosphorization and graphitization.

A mass ratio of the carbon nanosphere to the low melting transition metal compound intermediate is 1:1-3:1.

In the step (2) of preparing a composite carbon nanosphere, the hydrothermal reaction with the solvent goes at 40-90° C. for 20-80 mins, and the solid-liquid separation is executed by means of suction filtration and washing, then the resultant filter cake is placed in a vacuum drying oven at 50-60° C. overnight.

A precursor of the red phosphorus in the step (3) may be in a form of a 60-100 mesh powder or a 10-20 mesh microsphere particle;

In the process of red phosphorus being ball-milled, the red phosphorus and stainless-steel balls are put at a mass ratio of 1:10-1:50 into a stainless-steel ball tank, then ball-milled at a speed of 300-500 rpm for 1-5 h in a nitrogen atmosphere, and the hydrothermal treatment process goes at 150-200° C. for 10-12 h.

In the step (4), a mass concentration of the red phosphorus dispersion liquid is 10%-20%, a mass concentration of the composite carbon nanosphere powder material in the solution is 10%-20%, and a mass ratio of the red phosphorus to the composite carbon nanosphere powder material is 1:1-3:1.

In the step (4), the hydrothermal reaction with the solvent goes at 150-500° C. for 20-60 mins.

An application of the prepared phosphorus-carbon composite negative electrode material based on carbon nanotubes doped with red phosphorus as a negative electrode of a lithium-ion battery is provided.

The assembly steps of the high-capacity and high-rate lithium-ion battery are as follows. Mixing the phosphorus-carbon composite negative electrode material prepared above with binders (PVDF) and acetylene black (AB) at a mass ratio of 8:1.1: mixing them evenly in a N-methyl pyrrolidone (NMP) solvent into paste then applying the paste on a copper foil: after vacuum drying the copper foil at 80° C., using a die-cut piece as a working electrode, and using a lithium metal piece as a counter electrode; assembling a button cell (half-cell) in an experimental electrolyte system of 1.0 M LiTFSI in DOL:DME(V:V=1:1)+1.0 wt. % LiNO$_3$ and carrying out a charging-discharging cycle test.

Example 1

1.1 Preparing a SnS$_2$ nanosheet intermediate solution. take tin tetrachloride and thioacetamide at a molar ratio of 1:1 and dissolve them in a high-purity ethanol solution, stir the solution at 300 rpm to mix them evenly, a reaction goes for 30 mins at 60° C. to give a 2 wt. % SnS$_2$ intermediate solution for later use.

1.2 Preparing a SnS$_2$@CNT composite material: soak carbon nanotubes (a CNT diameter is 15-25 nm, a tube length is 100-150 μm) at a mass fraction of 2 w % in the above SnS$_2$ intermediate solution and continuously heat the solution to 60° C. at 300 rpm, a reaction goes for 40 mins, after samples have been cooled to room temperature, wash and filtrate the obtained samples with high-purity ethanol for multiple times, finally dry the obtained samples overnight in a vacuum oven at 50° C. to give a SnS$_2$@CNT composite carbon nanosphere powder material.

1.3 Preparing a carbon nanosphere dispersion liquid: weigh the above SnS$_2$@CNT composite carbon nanosphere powder material and disperse it at a mass fraction of 2% in a mixed solvent of ethanol/deionized water, then ultrasonically disperse it for 50 mins to give a uniform carbon nanosphere dispersion liquid.

1.4 Preparing a red phosphorus dispersion liquid disperse red phosphorus in deionized water for ball milling, and put the red phosphorus and stainless-steel balls at a mass ratio of 1:30 into a stainless-steel ball tank, then ball-mill them at a speed of 300 rpm for 1 h in a nitrogen atmosphere, after that transfer them in to a reactor; a hydrothermal treatment goes at 200° C. for 12 h to give a product, dry the product overnight in a vacuum drying oven at 50° C., disperse the dried red phosphorus at a mass fraction of 2% in a mixed solvent of ethanol/deionized water, then ultrasonically disperse it for 80 mins to give a uniform red phosphorus dispersion liquid.

1.5 mixing the dispersion liquids and performing reaction and purification: add the red phosphorus dispersion liquid into the composite carbon nanosphere dispersion liquid at a mass ratio of red phosphorus/carbon nanotubes 2:1 and ultrasonically disperse them for 50 mins to give a mixed solution, put the obtained mixed solution into a reactor, where a hydrothermal reaction goes at 200° C. for 60 mins; cool the product to room temperature, then remove its supernatant, and centrifuge and wash the solid substances deposited in the lower layer several times to give a phosphorus-carbon composite negative electrode material.

1.6 freeze-drying the phosphorus-carbon composite negative electrode material. put the above obtained phosphorus-carbon composite negative electrode material into a −80° C. freeze-dryer to perform lyophilization, finally give a doped modified phosphorus-carbon composite negative electrode material (P-CNT@SnS$_2$).

1.7 Assembling a high-capacity and high-rate lithium-ion battery: mix the phosphorus-carbon composite negative electrode material prepared above with binders (PVDF) and acetylene black (AB) at a mass ratio of 8:1:1; mix them evenly in A N-methyl pyrrolidone (NMP) solvent into paste then apply the paste on a copper foil; after vacuum drying the copper foil at 80° C., use a die-cut piece as a working electrode, and use a lithium metal piece as a counter electrode; assemble a button cell (half-cell) in an experimental electrolyte system of 1.0 M LiTFSI in DOL:DME (V:V=1:1)+1.0 wt. % LiNO$_3$ and carry out a charging-discharging cycle test.

1.8 FIG. 1 shows the preparation of the phosphorus-carbon composite negative electrode material. Put the carbon nanosphere (or a modified carbon nanosphere, which is a material different in particle sizes and skeleton structures obtained through any one or more of surface modification processes of amination, carboxylation, hydroxylation, phosphorization, and graphitization) in a transition metal nano-doping liquid to give a carbon nanosphere doped with a transition metal nanosheet, and then put it into a small particle-size red phosphorus dispersion liquid treated through ball milling. a reaction goes in a constant temperature water bath to give a phosphorus-carbon composite negative electrode material.

Figure 2:
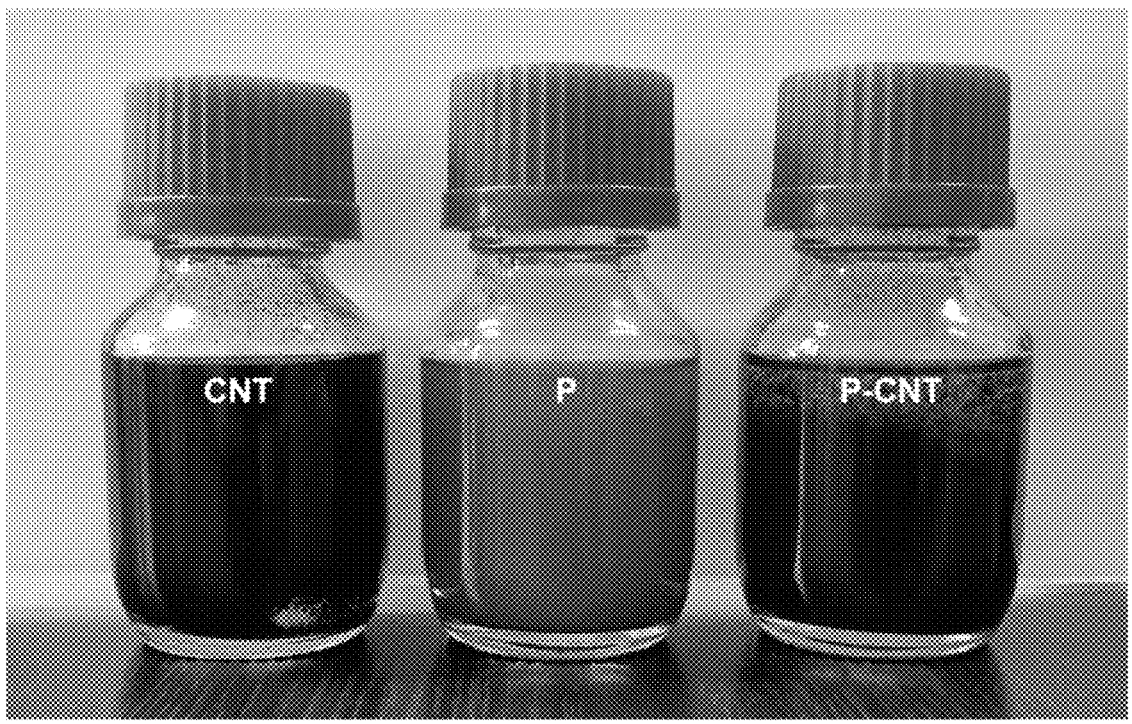
FIG. 2 is optical pictures of the carbon nanosphere/the red phosphorus/the phosphorus-carbon composite material.

1.9 FIG. 2 is optical pictures of the carbon nanosphere/the red phosphorus/the phosphorus-carbon composite material. It can be seen that the carbon nanospheres/red phosphorus/phosphorus-carbon composite materials are uniformly dispersed in the solvent, and no agglomeration and precipitation are observed.

Figure 3:
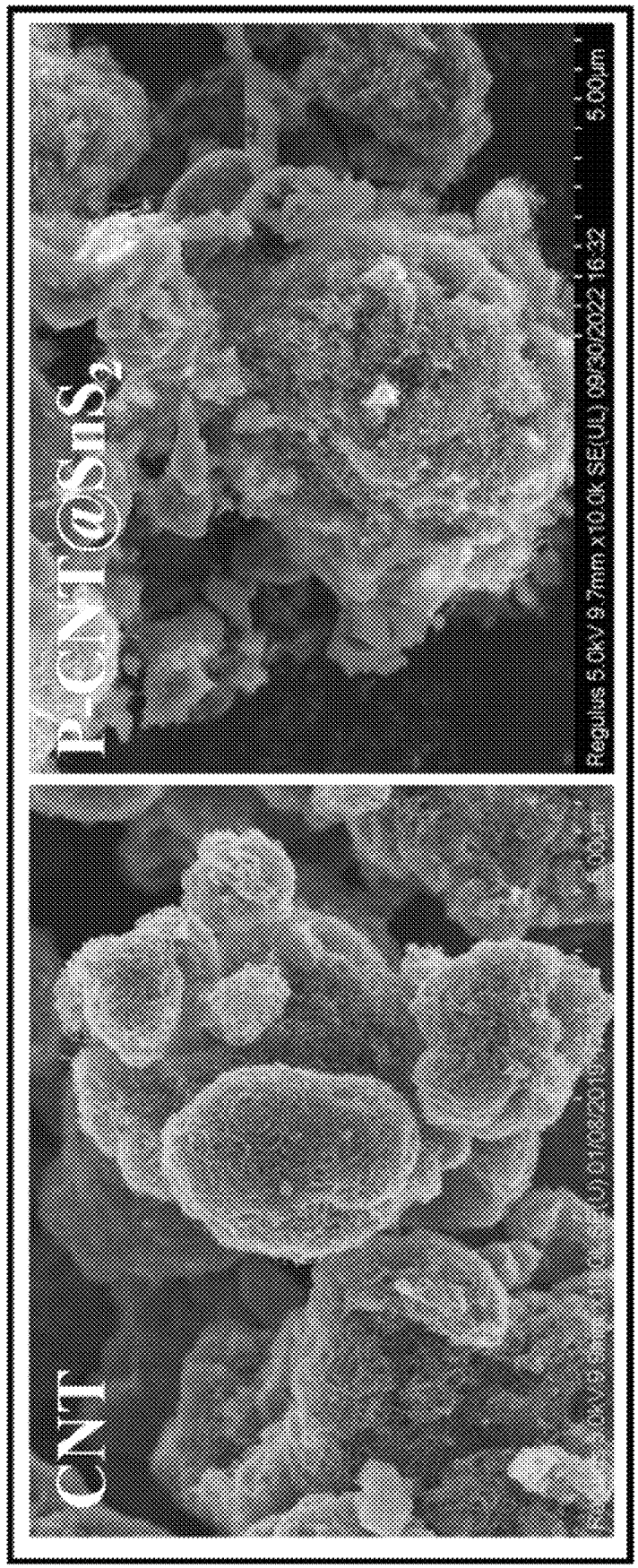
FIG. 3 shows SEM pictures of CNT and P-CNT@SnS$_2$ materials prepared in Example 1, where A is a SEM picture of the CNT material, B is a SEM picture of the P-CNT@SnS$_2$ material.

1.10 FIG. 3 shows SEM pictures of CNT and P-CNT@$SnS_2$ materials. The CNT presents a spherical structure assembled with nanotubes, and that the carbon nanospheres are uniformly mixed with the small particle-size red phosphorus can be observed on the P-CNT@$SnS_2$, showing achievement of co-coating.

Figure 4:
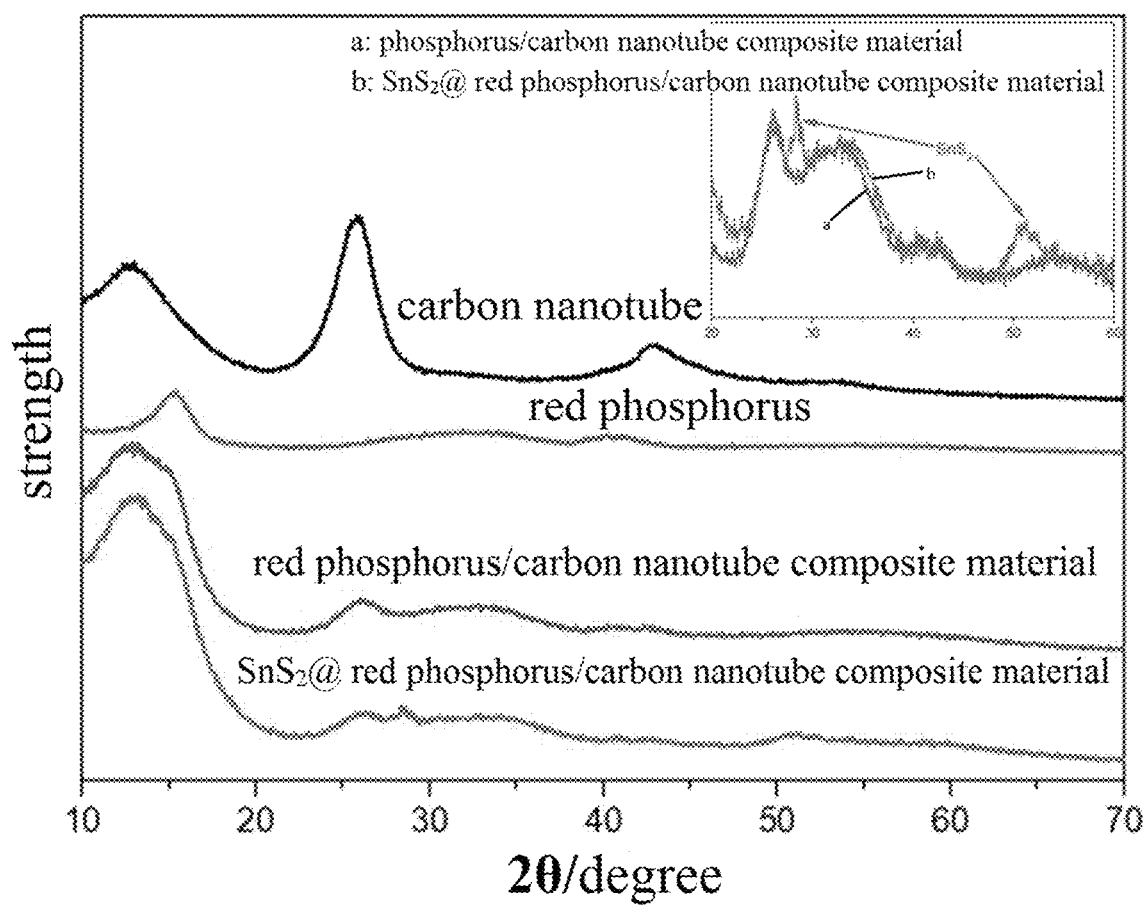
FIG. 4 shows XRD pictures of the carbon nanospheres /the red phosphorus/the phosphorus-carbon composite material before and after doped with SnS prepared in Example 1$_2$.

1.11 FIG. 4 shows XRD pictures of the carbon nanospheres/the red phosphorus/the phosphorus-carbon composite material before and after doped with $SnS_2$. Among them, the carbon nanospheres/the red phosphorus carbon nanotube composite materials before and after doped all show a typical carbon broad peak at 26.5°, at the same time, compared with the XRD pictures of the red phosphorus carbon nanotube composite materials before and after doped, two characteristic peaks belonging to $SnS_2$ occur to the doped material at 28.5° and 51.1°, indicating that $SnS_2$ has been successfully doped into the carbon nanosphere.

Figure 5:
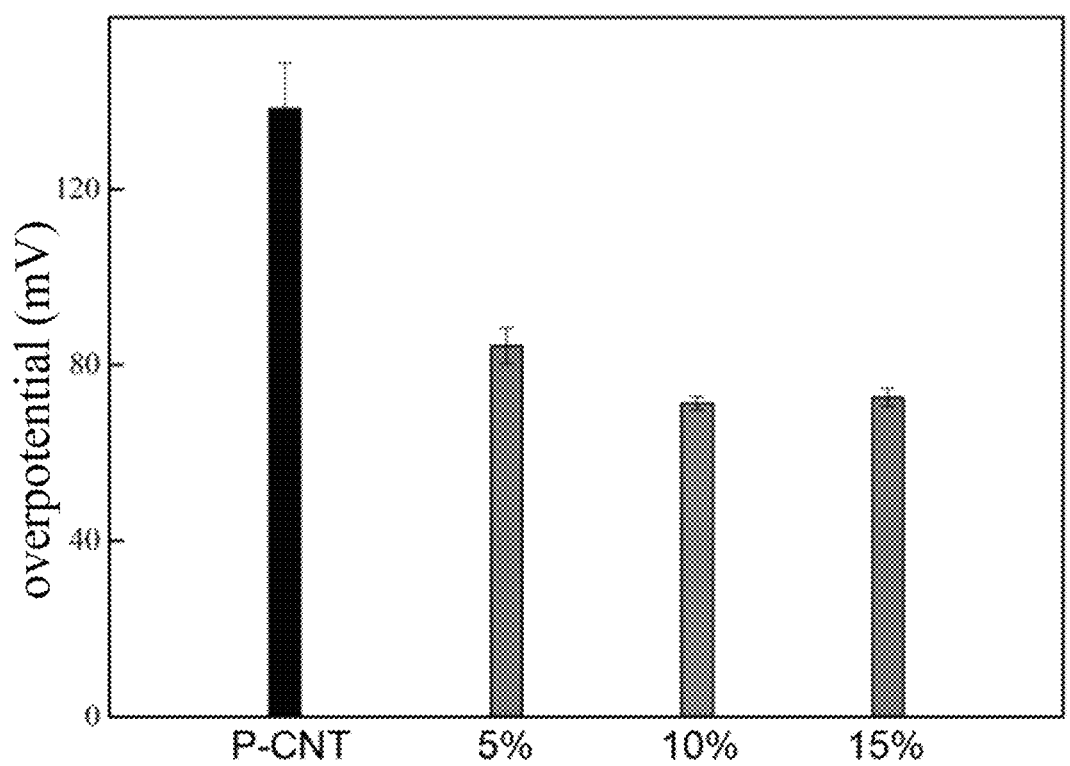
FIG. 5 shows a SEM picture and a potential histogram of the carbon nanosphere /the phosphorus-carbon composite material doped with SnS$_2$ prepared in Example 1, where A is a SEM picture of the carbon nanosphere/the phosphorus-carbon composite material doped with SnS$_2$: B is a potential histogram of the carbon nanosphere /the phosphorus-carbon composite material doped with SnS$_2$.

1.12 FIG. 5 shows a SEM picture and a potential histogram of the carbon nanosphere/the phosphorus-carbon composite material doped with $SnS_2$. When the doping amount increases from 0% to 10%, the uneven surface of the material formed by the carbon nanospheres gradually becomes smooth; when the doping amount increases to 15%, the surface becomes rough again and it is observable that the size of the carbon nanosphere increases: this may be caused by the change of the internal structure of the carbon nanosphere due to an excessive doping amount. It can be seen from the potential histogram that the potential of the electrode materials doped with $SnS_2$ intermediates decreases to varying extents: however, when the doping amount is 10%, the potential is the lowest (65 mV), indicating that there is a potential difference of about 0.3 V between the lithium-tin alloy and the lithium metal, so that the carbon nanospheres doped with $SnS_2$ have excellent lithophilicity. This feature is beneficial to evenly immerse the molten lithium metal into the internal channel of the carbon nanosphere during the stirring process to give fuller and denser phosphorus-carbon composite microsphere particles. which have a better specific capacity and a rate performance, furthermore this feature avoids the side reaction between the metal lithium and the electrolyte, and effectively improves the utilization rate of the electrolyte and active lithium.

Figure 6:
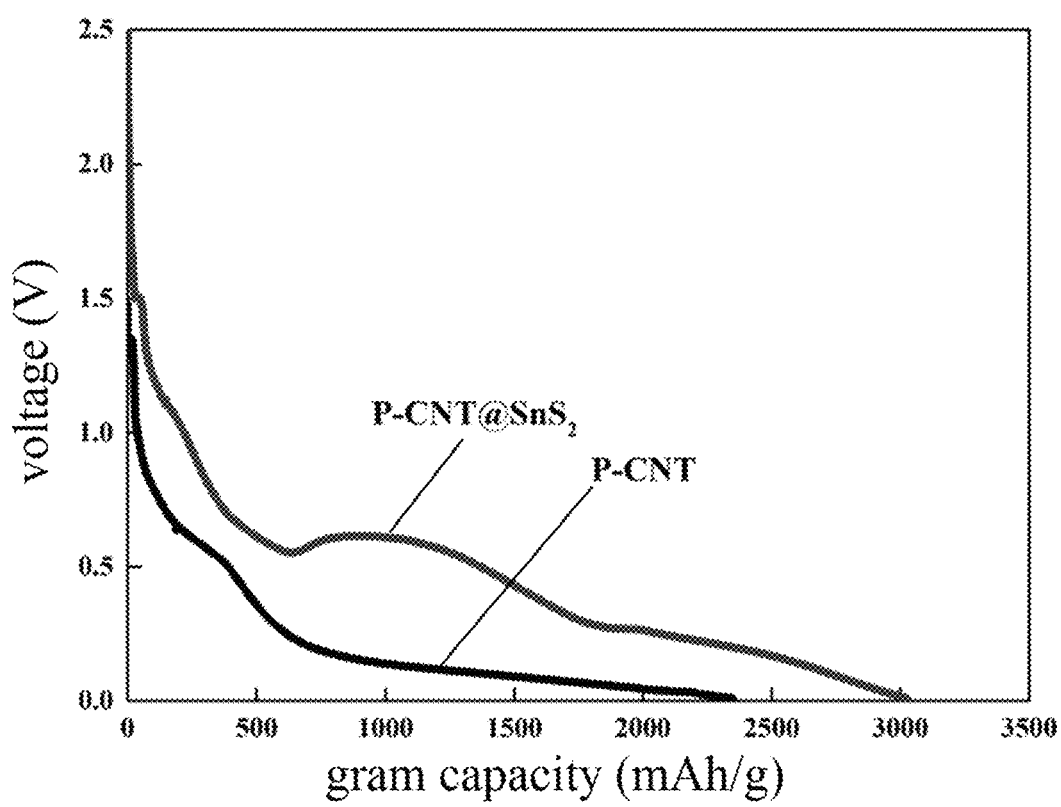
FIG. 6 shows first discharge curves of red phosphorus/carbon nanotube and SnS$_2$@red phosphorus/carbon nanotube materials prepared in Example 1.

1.13 FIG. 6 shows first discharge curves of red phosphorus/carbon nanotube and SnS2@ red phosphorus/carbon nanotube materials. The first discharge specific capacity of the phosphorus-carbon negative electrode material after doped is 3020 mA·h·$g^{-1}$, significantly higher than that before doped (2355 mA·h·$g^{-1}$).

Figure 7:
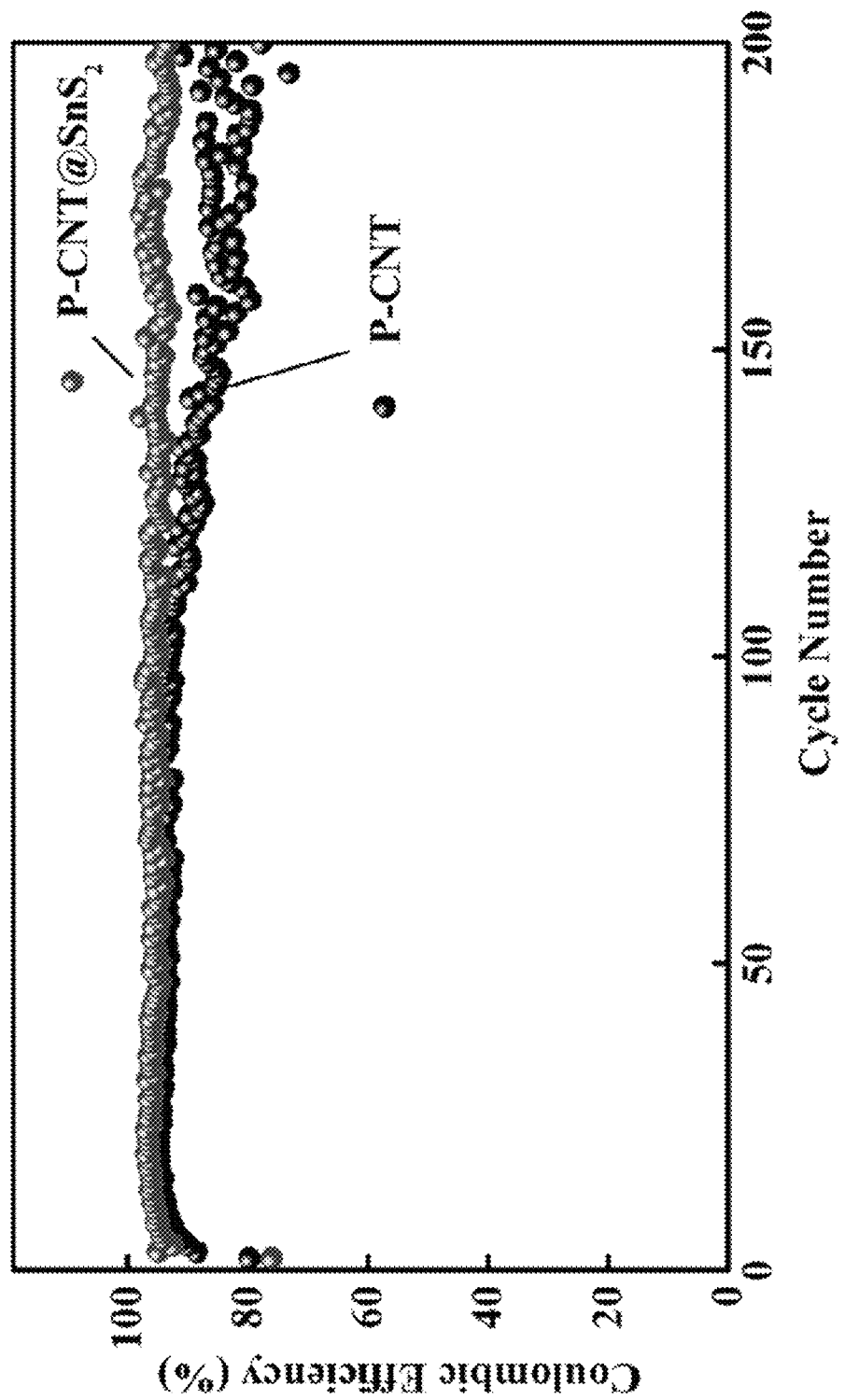
FIG. 7 shows cycling performance pictures and potential-time curves of CNT and SnS$_2$@CNT materials prepared in Example 1 (in figures).

1.14 FIG. 7 shows cycling performance pictures and potential-time curves of CNT and $SnS_2$@CNT materials (in figures). At a high current density of 3 mA $cm^{-2}$. the coulombic efficiency of the $SnS_2$@CNT basically maintains at 99.6% after 200 cycles, while the coulombic efficiency of the CNT fluctuates significantly after 100 cycles, indicating that the SnS2@CNT material has better cycling stability. In addition, the potential-time diagram also indicates that compared with the CNT (-150 mV), the $SnS_2$@CNT has a relatively high potential (-71 mV), which reduces the possibility of the side reaction with a liquid electrolyte, ensuring less electrolyte consumption and longer cycle life.

Figure 8A:
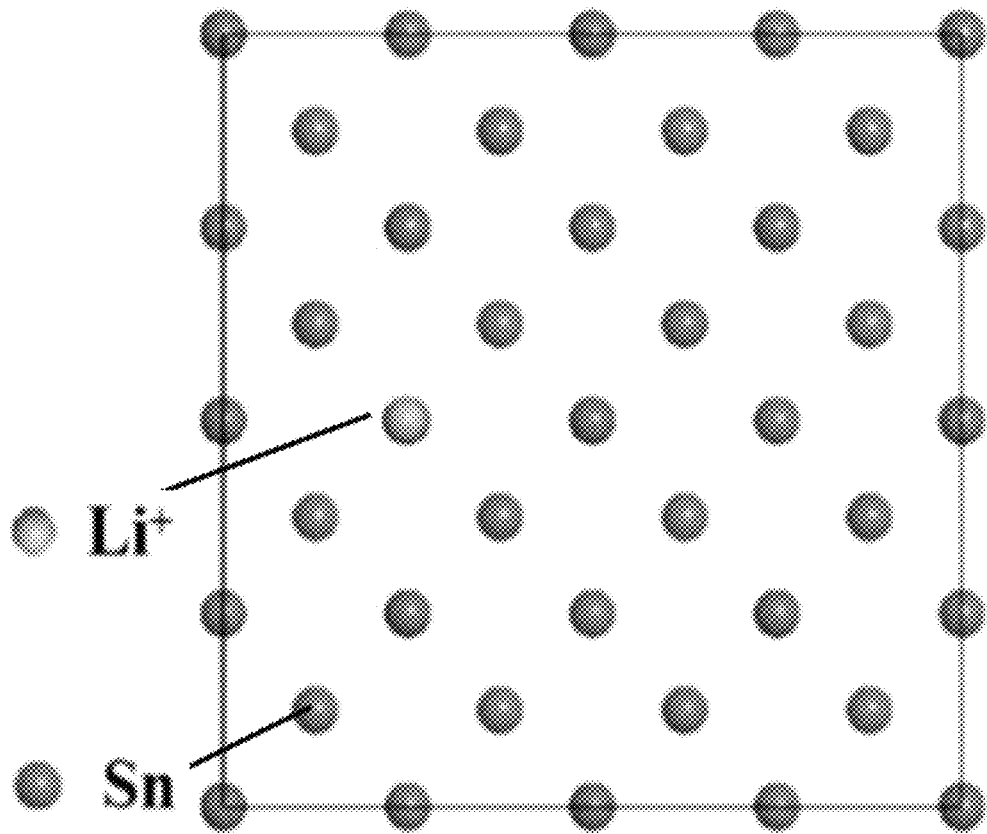
FIGS. 8A-B shows binding energy simulated by DFT between Li$^+$ and different substrates in Example 1.
Figure 8B:
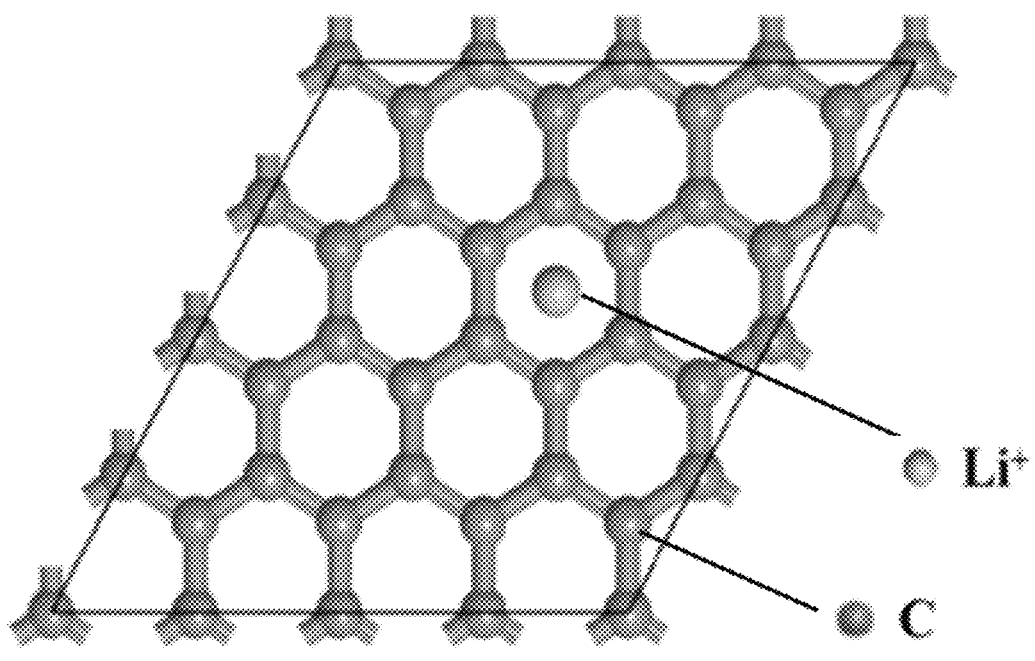

1.15 FIG. 8 shows binding energy simulated by DFT between $Li^+$ and different substrates. It can be seen that $Li^+$ and a 3D conductive carbon substrate doped with $SnS_2$ have a lower binding energy (-1.12 eV), indicating that it has better lithiphilicity.

Example 2

2.1 Preparing a $Ni_3S_4$ nanosbeet intermediate solution. take nickel nitrate hexahydrate and thiourea at a molar ratio of 1:2 and dissolve them in an anhydrous methanol solution, stir the solution at 500 rpm to mix them evenly, a reaction goes for 20 mins at 80° C. to give a 1 wt. % $Ni_3S_4$ intermediate solution for later use. The introduction of the $Ni_3S_4$ nanosheet intermediate can effectively reduce the formation of by-product white phosphorus and improve the safety of the preparation process.

2.2 Preparing a $Ni_3S_4$@CNT compxosite material. put carbon nanotubes (a CNT diameter is 15-25 run, a tube length is 100-150 μm) in a concentrated $H_2SO_4$ solution and concentrated $HNO_3$ solution at a volume ratio of 3:1 and keep under reflux at 80° C. for 12 hours, wash the product to neutral and then dry it; remove impurities on the surface of the carbon nanotube and add carboxyl and hydroxyl groups, which make it easier to disperse in a solvent and conducive to compounding with $Ni_3S_4$ intermediates and red phosphorus particles, soak the modified carbon nanosphere at a mass fraction of 1% in the $Ni_3S_4$ intermediate solution, and continuously heat it to 80° C. at 500 rpm, a reaction goes for 40 mins, after samples have been cooled to room temperature, wash and filtrate the obtained samples multiple times to collect them, finally dry the obtained samples overnight in a vacuum oven at 50° C. to give a $Ni_3S_4$@CNT composite carbon nanosphere powder material.

2.3 Preparing a carbon nanosphere dispersion liquid: weigh the above $Ni_3S_4$@CNT composite carbon nanosphere powder material and disperse it at a mass fraction of 1% in anhydrous methanol, then ultrasonically disperse it for 30 mins to give a uniform carbon nanosphere dispersion liquid.

2.4 Preparing a red phosphorus dispersion liquid: disperse red phosphorus in deionized water for ball milling, and put the red phosphorus and stainless-steel balls at a mass ratio of 1:20 into a stainless-steel ball tank, then ball-mill them at a speed of 300 rpm for 2 h in a nitrogen atmosphere, after that transfer them in to a reactor: a hydrothermal treatment goes at 150° C. for 20 h to give a product, dry the product overnight in a vacuum drying oven at 50° C.; disperse the dried red phosphorus in anhydrous methanol, then ultrasonically disperse it for 60 mins to give a uniform 1 wt. % red phosphorus dispersion liquid.

2.5 mixing the dispersion liquids and performing reaction and purification: add the red phosphorus dispersion liquid into the composite carbon nanosphere dispersion liquid at a mass ratio of red phosphorus/carbon nanotubes 3:1 and ultrasonically disperse them for 30 mins to give a mixed solution, put the obtained mixed solution into a reactor, where a hydrothermal reaction goes at 150° C. for 50 mins; cool the product to room temperature. then remove its supernatant, and centrifuge and wash the solid substances deposited in the lower layer several times to give a modified and doped phosphorus-carbon composite negative electrode material (P-CNT@Ni$_3$S$_4$).

2.6 freeze-drying the phosphorus-carbon composite negative electrode material put the above obtained phosphorus-carbon composite negative electrode material into a −80° C. freeze-dryer to perform lyophilization, finally give a phosphorus-carbon nanotube composite negative electrode material.

2.7 Assembling a high-capacity and high-rate lithium-ion battery: mix the phosphorus-carbon composite negative electrode material prepared above with binders (PVDF) and acetylene black (AB) at a mass ratio of 8.1:1; mix them evenly in A N-methyl pyrrolidone (NMP) solvent into paste then apply the paste on a copper foil; after vacuum drying the copper foil at 80° C., use a die-cut piece as a working electrode, and use a lithium metal piece as a counter electrode; assemble a button cell (half-cell) in an experimental electrolyte system of 1.0 M LiTFSI in DOL:DME (V:V=1:1)+1.0 wt. % LiNO$_3$ and carry out a charging-discharging cycle test.

Figure 9A:
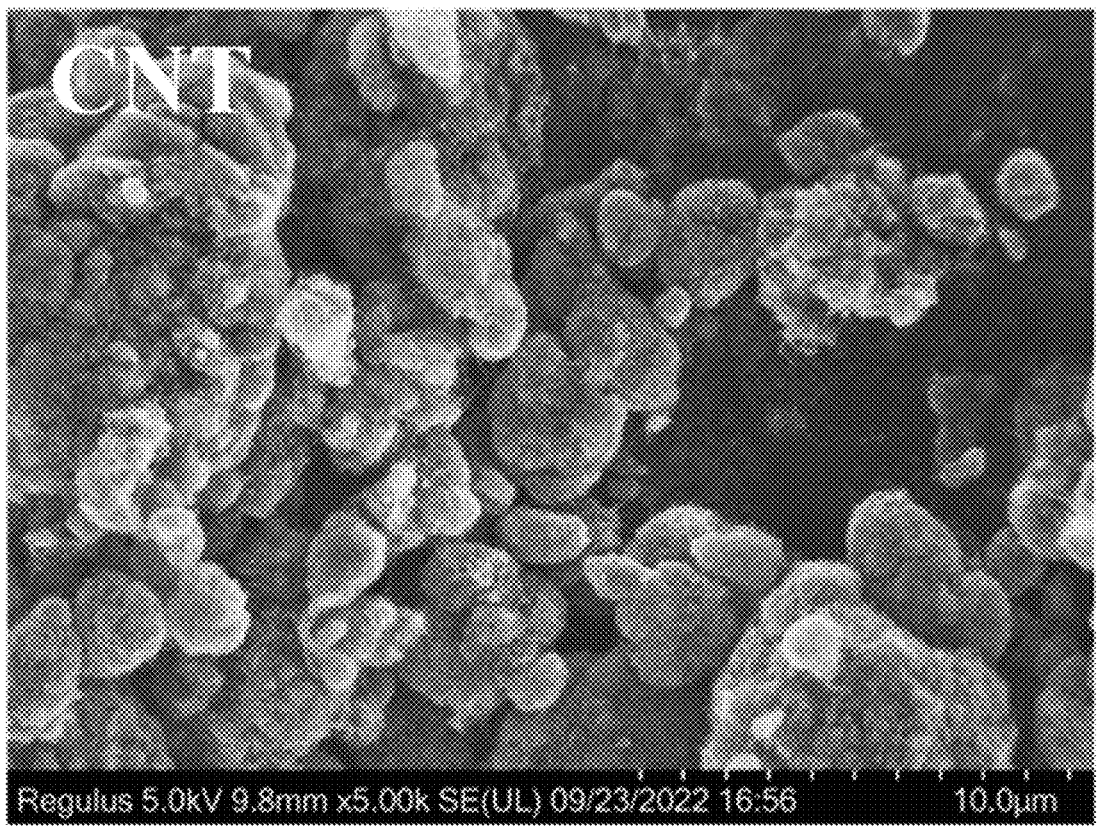
FIGS. 9A-B shows SEM pictures of CNT and P-CNT@Ni$_3$S$_4$ materials prepared in Example 2, where
Figure 9B:
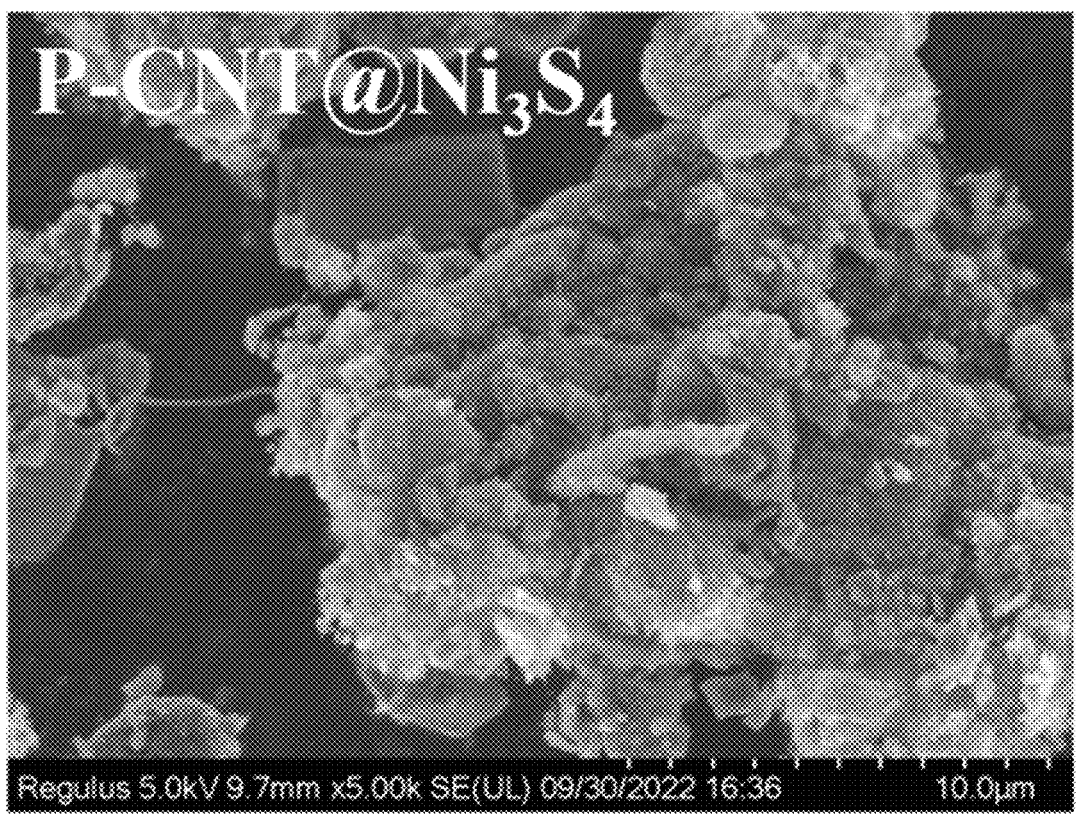

2.8 FIG. 9 shows SEM pictures of CNT and P-CNT@Ni$_3$S$_4$ materials. In the SEM picture of the P-CNT@Ni3S4 material, it can be observed that the carbon nanospheres are fully mixed with red phosphorus, increasing the conductivity of the red phosphorus material and restraining the volume expansion in the charging-discharging process.

Example 3

3.1 Preparing a CoSe$_2$ nanosheet intermediate solution: take cobalt chloride and selenium powder at a molar ratio of 1:2 and dissolve them in an anhydrous ethanol solution, stir the solution at 400 rpm to mix them evenly, a reaction goes for 50 mins at 60° C. to give a 0.5 wt % CoSe$_2$ intermediate solution for later use.

3.2 Preparing a CoSe$_2$@CNT composite material: put carbon nanotubes (a CNT diameter is 15-25 nm, a tube length is 100-150 μm) in a methanol solvent containing methyl phosphoric acid, stir them magnetically for 60 mins to mix them evenly, then put them in an oil bath at 110° C. to continue stirring until the methanol was completely volatilized, thus add the phosphorus-containing groups on the surface of the carbon nanosphere through high-temperature reduction and oxidation, so that their chemisorption and catalytic effects are conducive to improving the electrochemical properties of the material: soak the modified carbon nanosphere containing phosphorus-containing groups at a mass fraction of 0.5% in the CoSe$_2$ intermediate solution, and continuously heat it to 50° C. at 400 rpm, a reaction goes for 80 mins, after samples have been cooled to room temperature, wash and filtrate the obtained samples multiple times to collect them, finally dry the obtained samples overnight in a vacuum oven at 50° C. to give a CoSe$_2$@CNT composite carbon nanosphere powder material.

3.3 Preparing a carbon nanosphere dispersion liquid. weigh the above CoSe$_2$@CNT composite carbon nanosphere powder material and disperse it in anhydrous ethanol, then ultrasonically disperse it for 40 mins to give a uniform 0.5 wt. % carbon nanosphere dispersion liquid.

3.4 Preparing a red phosphorus dispersion liquid: disperse red phosphorus in deionized water for ball milling, and put the red phosphorus and stainless-steel balls at a mass ratio of 1:40 into a stainless-steel ball tank, then ball-mill them at a speed of 400 rpm for 4 h in a nitrogen atmosphere, after that transfer them in to a reactor; a hydrothermal treatment goes at 170° C. for 16 h to give a product, dry the product overnight in a vacuum drying oven at 50° C.; disperse the dried red phosphorus in anhydrous ethanol, then ultrasonically disperse it for 80 mins to give a uniform 0.5 wt. % red phosphorus dispersion liquid.

3.5 mixing the dispersion liquids and performing reaction and purification: add the red phosphorus dispersion liquid into the composite carbon nanosphere dispersion liquid at a mass ratio of red phosphorus/carbon nanotubes 3:1 and ultrasonically disperse them for 40 mins to give a mixed solution, put the obtained mixed solution into a reactor, where a hydrothermal reaction goes at 180° C. for 40 mins; cool the product to room temperature, then remove its supernatant, and centrifuge and wash the solid substances deposited in the lower layer several times to give a modified and doped phosphorus-carbon composite negative electrode material(P-CNT@CoSe$_2$).

3.6 freeze-drying the phosphorus-carbon composite negative electrode material: put the above obtained phosphorus-carbon composite negative electrode material into a −80° C. freeze-dryer to perform lyophilization, finally give a phosphorus-carbon nanotube composite negative electrode material.

3.7 Assembling a high-capacity and high-rate lithium-ion battery: mix the phosphorus-carbon composite negative electrode material prepared above with binders (PVDF) and acetylene black (AB) at a mass ratio of 8:1:1; mix them evenly in A N-methyl pyrrolidone (NMP) solvent into paste then apply the paste on a copper foil; after vacuum drying the copper foil at 80° C., use a die-cut piece as a working electrode, and use a lithium metal piece as a counter electrode; assemble a button cell (half-cell) in an experimental electrolyte system of 1.0 M LITFSI in DOL:DME (V:V=1:1)+1.0 wt. % LiNO$_3$ and carry out a charging-discharging cycle test.

Figure 10A:
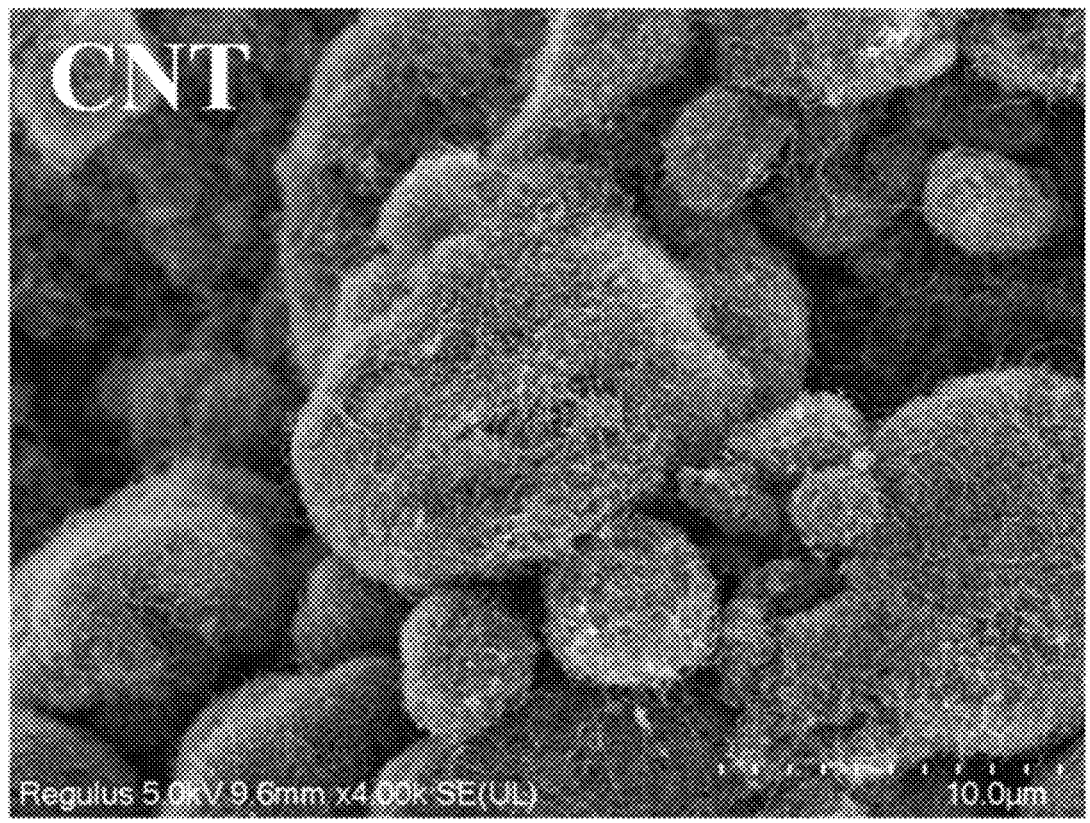
FIGS. 10A-B shows SEM pictures of CNT and P-CNT@CoSe$_2$ materials prepared in Example 3, where
Figure 10B:
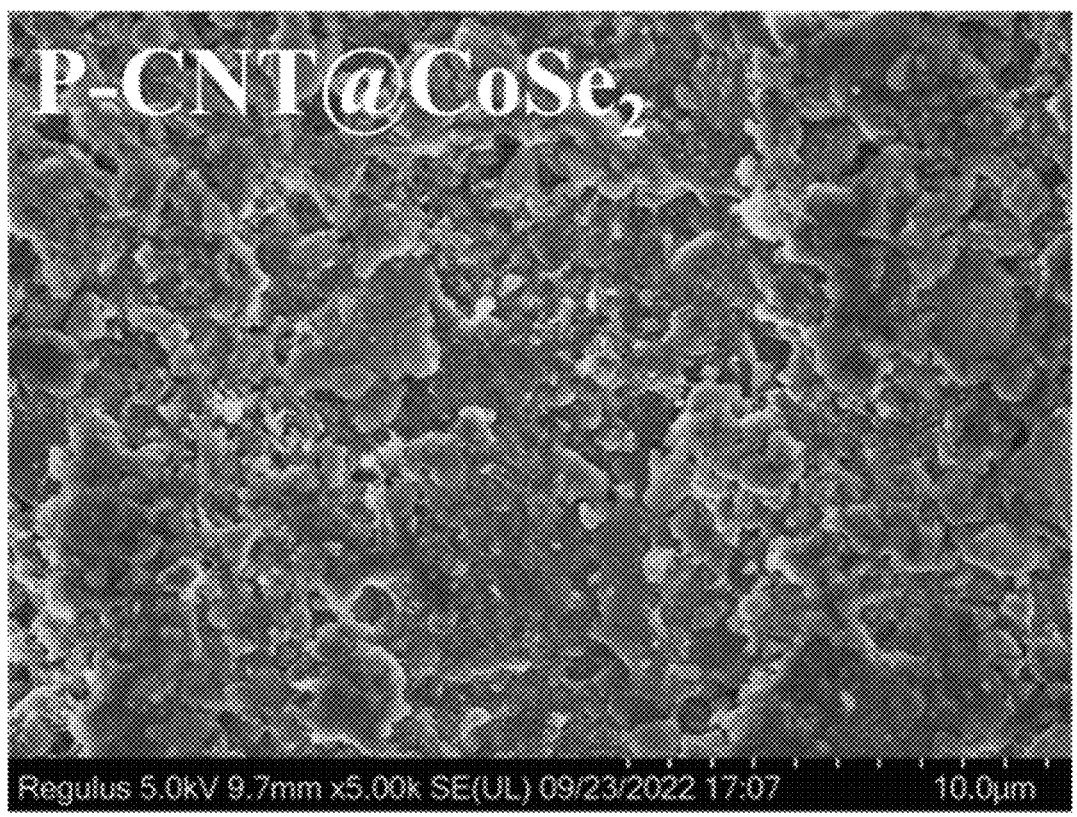

3.8 FIG. 10 shows SEM pictures of CNT and P-CNT@; CoSe$_2$ materials. After forming the phosphorus-carbon composite material, carbon nanospheres adhere to the surface of the red phosphorus material, and small particle-size red phosphorus particles adhere inside the carbon nanosphere.

Example 4

4.1 Preparing a GeS$_2$ nanosheet intermediate solution: take germanium fluoride and thioacetamide at a molar ratio of 1:3 and dissolve them in an anhydrous ether solution, stir the solution at 1000 rpm to mix them evenly, a reaction goes for 40 mins at 100° C. to give a 1 wt. % GeS$_2$ solution for later use.

4.2 Preparing a GeS$_2$@CNT composite material: put carbon nanotubes (a CNT diameter is 15-25 nm, a tube length is 100-150 μm) in a tube furnace and roast it at 600° C. in an inert atmosphere for 4 h to enhance the graphitization strength of the carbon nanosphere, so that the 3D skeleton structure of carbon nanotubes effectively solves the problem of volume expansion in a charging-discharging process; soak the roasted carbon nanosphere containing phosphorus-containing groups at a mass fraction of 1% in the GeS$_2$ intermediate solution, and continuously heat it to 90° C. at 1000 rpm, a reaction goes for 60 mins, after samples have been cooled to room temperature, wash and filtrate the obtained samples multiple times to collect them, finally dry the obtained samples overnight in a vacuum oven at 50° C. to give a GeS$_2$@CNT composite carbon nanosphere powder material.

4.3 Preparing a carbon nanosphere dispersion liquid. weigh the above GeS$_2$@CNT composite carbon nanosphere powder material and disperse it in anhydrous ether, then ultrasonically disperse it for 80 mins to give a uniform 1 wt % carbon nanosphere dispersion liquid.

4.4 Preparing a red phosphorus dispersion liquid: disperse red phosphorus in deionized water for ball milling, and put the red phosphorus and stainless-steel balls at a mass ratio of 1:30 into a stainless-steel ball tank, then ball-mill them at a speed of 350 rpm for 5 h in a nitrogen atmosphere. after that transfer them in to a reactor: a hydrothermal treatment goes at 180° C. for 10 h to give a product, dry the product overnight in a vacuum drying oven at 50° C., disperse the dried red phosphorus at a mass fraction of 1% in anhydrous ether, then ultrasonically disperse it for 40 mins to give a uniform red phosphorus dispersion liquid.

4.5 mixing the dispersion liquids and performing reaction and purification: add the red phosphorus dispersion liquid into the composite carbon nanosphere dispersion liquid at a mass ratio of red phosphorus/carbon nanotubes 2:1 and ultrasonically disperse them for 45 mins to give a mixed solution, put the obtained mixed solution into a reactor, where a hydrothermal reaction goes at 300° C. for 30 mins; cool the product to room temperature, then remove its supernatant, and centrifuge and wash the solid substances deposited in the lower layer several times to give a phosphorus-carbon composite negative electrode material.

4.6 freeze-drying the phosphorus-carbon composite negative electrode material: put the above obtained phosphorus-carbon composite negative electrode material into a –80° C. freeze-dryer to perform lyophilization, finally give a doped and modified phosphorus-carbon composite negative electrode material(P-CNT@GeS$_2$).

4.7 Assembling a high-capacity and high-rate lithium-ion battery: mix the phosphorus-carbon composite negative electrode material prepared above with binders (PVDF) and acetylene black (AB) at a mass ratio of 8:1:1; mix them evenly in A N-methyl pyrrolidone (NMP) solvent into paste then apply the paste on a copper foil; after vacuum drying the copper foil at 80° C., use a die-cut piece as a working electrode, and use a lithium metal piece as a counter electrode, assemble a button cell (half-cell) in an experimental electrolyte system of 1.0 M LiTFSI in DOL:DME (V:V=1:1)+1.0 wt. % LiNO$_3$ and carry out a charging-discharging cycle test.

Figure 11A:
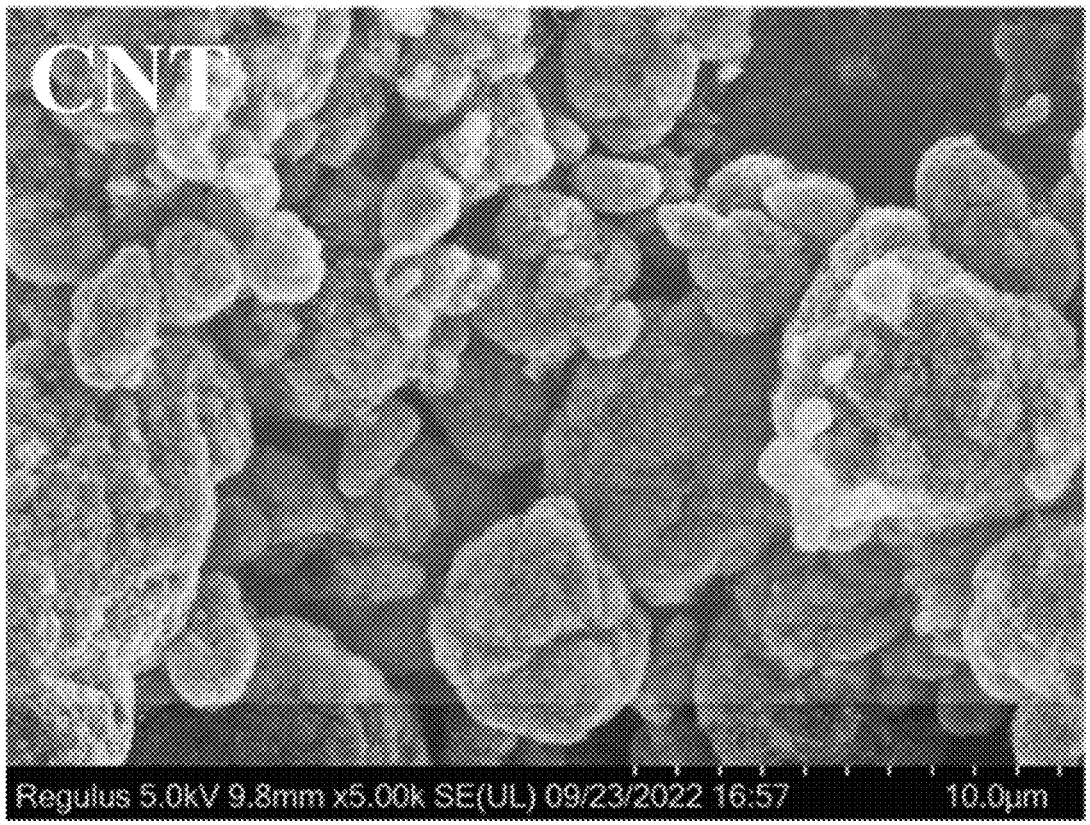
FIGS. 11A-B shows SEM pictures of CNT and P-CNT@ GeS$_2$ materials prepared in Example 4, where
Figure 11B:
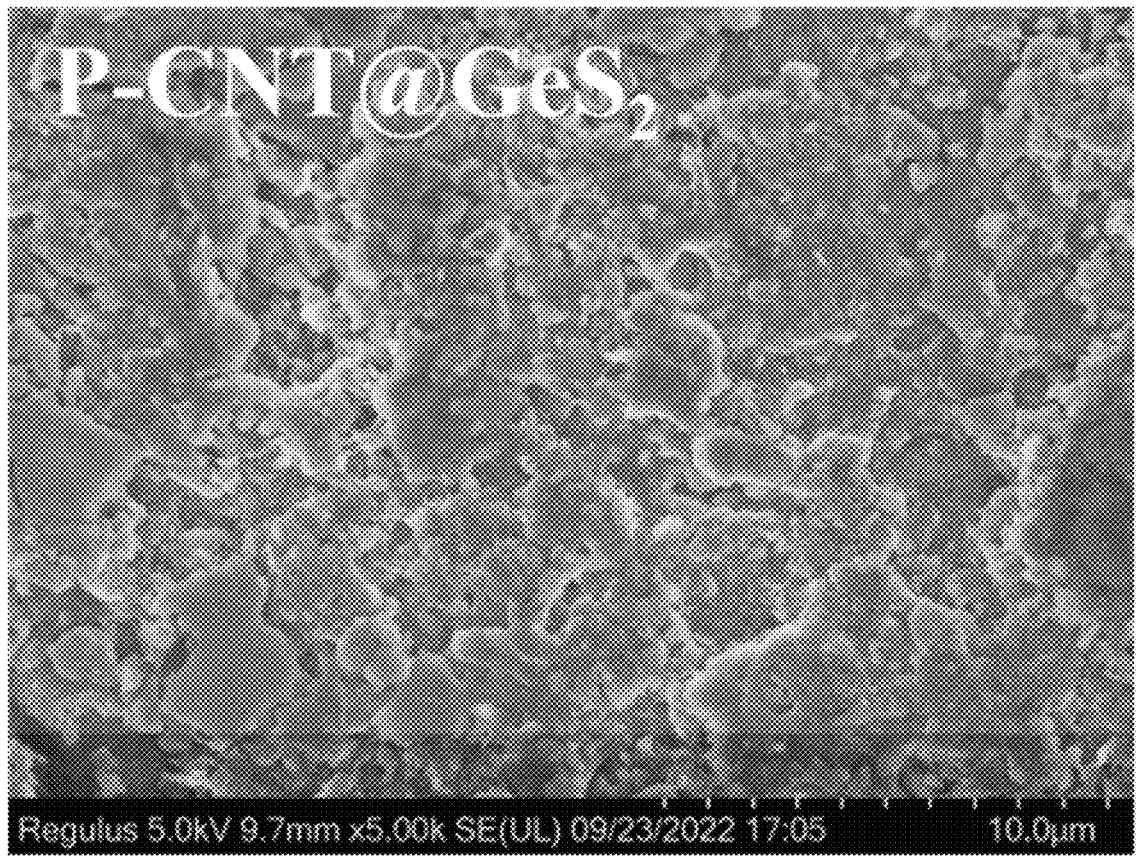

4.8 FIG. 11 shows SEM pictures of CNT and P-CNT@GeS$_2$ materials.

Example 5

5.1 Preparing a TiP nanosheet intermediate solution: take titanium sulfate and sodium hypophosphite at a molar ratio of 1:1 and dissolve them in an anhydrous ether solution, stir the solution at 1500 rpm to mix them evenly, a reaction goes for 20 mins at 70° C. to give a 2 wt. % TiP solution for later use.

5.2 Preparing a TiP@CNT composite material: put carbon nanotubes (a CNT diameter is 15-25 nm, a tube length is 100-150 μm) in a tube furnace and roast it at 800° C. in an inert atmosphere for 2 h to enhance the graphitization strength of the carbon nanosphere; soak the roasted carbon nanosphere at a mass fraction of 2% in the TiP intermediate solution, and continuously heat it to 70° C. at 1500 rpm, a reaction goes for 50 mins, after samples have been cooled to room temperature, wash and filtrate the obtained samples multiple times to collect them, finally dry the obtained samples overnight in a vacuum oven at 50° C. to give a TiP@CNT composite carbon nanosphere powder material.

5.3 Preparing a carbon nanosphere dispersion liquid: weigh the above TiP@CNT composite carbon nanosphere powder material and disperse it at a mass fraction of 2% in anhydrous ether, then ultrasonically disperse it for 90 mins to give a uniform carbon nanosphere dispersion liquid.

5.4 Preparing a red phosphorus dispersion liquid: disperse red phosphorus in deionized water for ball milling, and put the red phosphorus and stainless-steel balls at a mass ratio of 1:30 into a stainless-steel ball tank, then ball-mill them at a speed of 400 rpm for 2 h in a nitrogen atmosphere, after that transfer them in to a reactor: a hydrothermal treatment goes at 180° C. for 15 h to give a product, dry the product overnight in a vacuum drying oven at 50° C.; disperse the dried red phosphorus at a mass fraction of 2% in anhydrous ether, then ultrasonically disperse it for 40 mins to give a uniform red phosphorus dispersion liquid.

5.5 mixing the dispersion liquids and performing reaction and purification: add the red phosphorus dispersion liquid into the composite carbon nanosphere dispersion liquid at a mass ratio of red phosphorus/carbon nanotubes 1:1 and ultrasonically disperse them for 30 mins to give a mixed solution, put the obtained mixed solution into a reactor, where a hydrothermal reaction goes at 150° C. for 40 mins: cool the product to room temperature, then remove its supernatant, and centrifuge and wash the solid substances deposited in the lower layer several times to give a doped and modified phosphorus-carbon composite negative electrode material(P-CNT@TiP).

5.6 freeze-drying the phosphorus-carbon composite negative electrode material. put the above obtained phosphorus-carbon composite negative electrode material into a –80° C. freeze-dryer to perform lyophilization, finally give a doped and modified phosphorus-carbon composite negative electrode material(P-CNT@GeS$_2$).

5.7 Assembling a high-capacity and high-rate lithium-ion battery. mix the phosphorus-carbon composite negative electrode material prepared above with binders (PVDF) and acetylene black (AB) at a mass ratio of 8:1:1; mix them evenly in A N-methyl pyrrolidone (NMP) solvent into paste then apply the paste on a copper foil; after vacuum drying the copper foil at 80° C., use a die-cut piece as a working electrode, and use a lithium metal piece as a counter electrode; assemble a button cell (half-cell) in an experimental electrolyte system of 1.0 M LiTFSI in DOL:DME (V:V=1:1)+1.0 wt % LiNO$_3$ and carry out a charging-discharging cycle test.

Figure 12A:
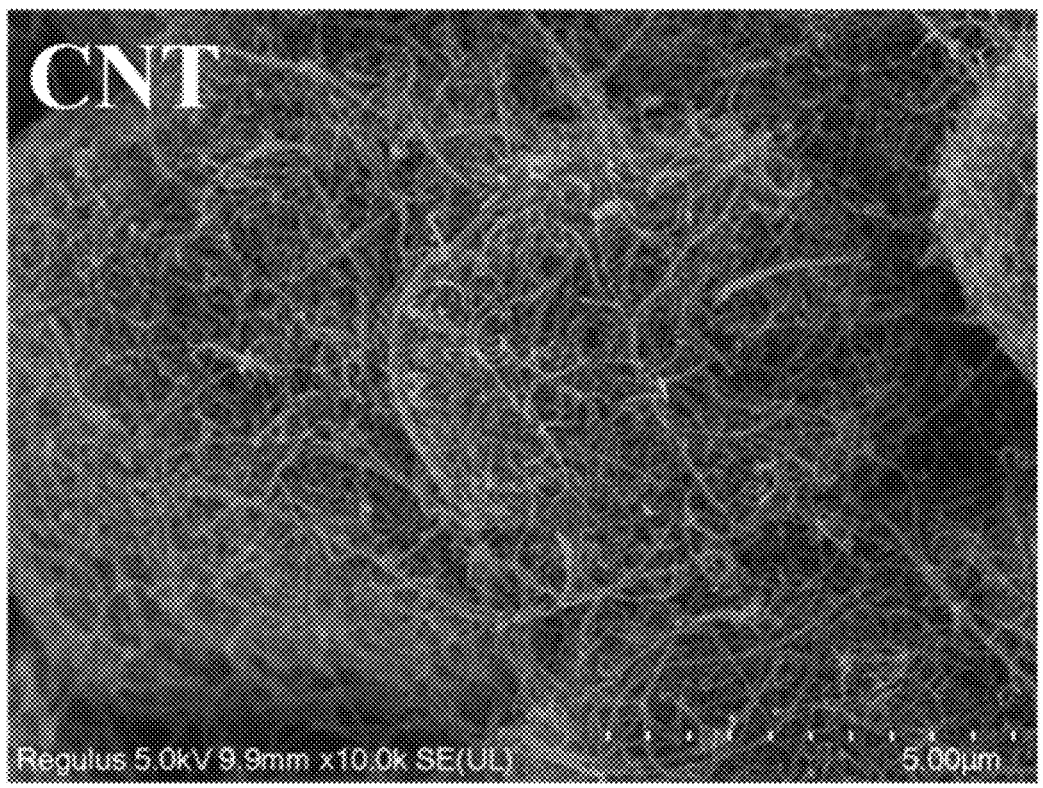
FIGS. 12A-B shows SEM pictures of CNT and P-CNT@ TiP materials prepared in Example 5, where
Figure 12B:
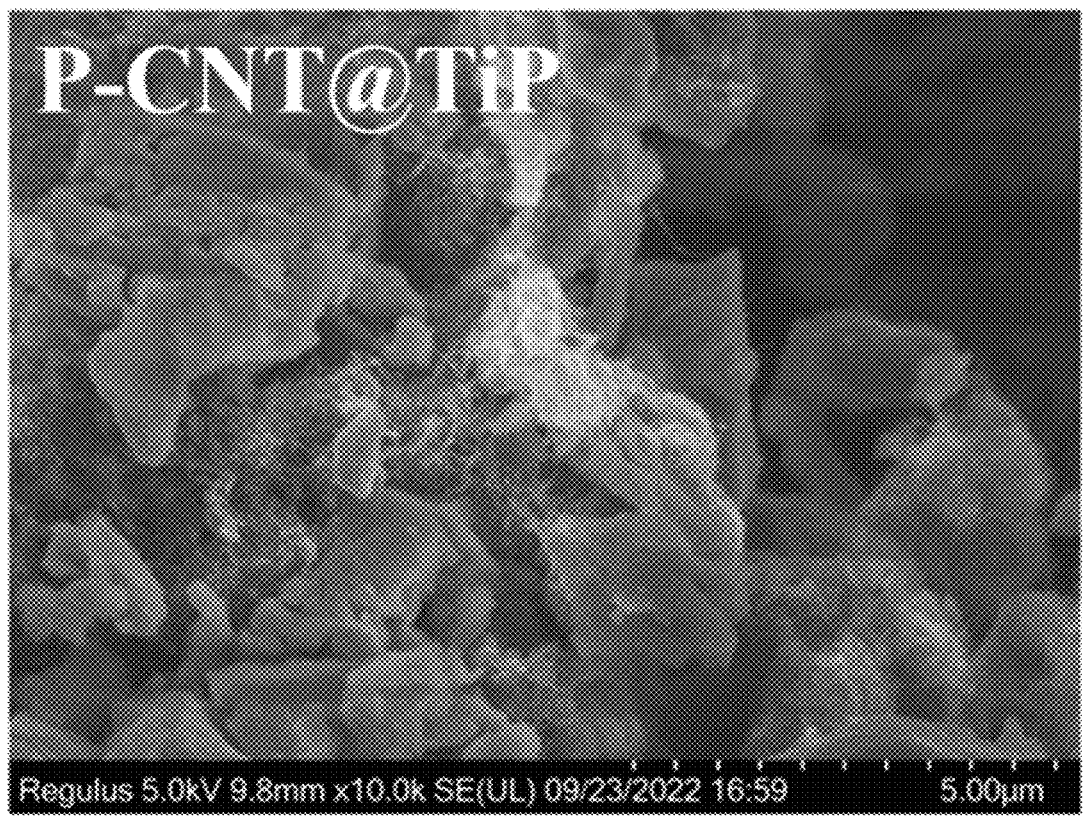

5.8 FIG. 12 shows SEM pictures of CNT and P-CNT@TiP materials.

Example 6

Its procedure is similar to example 1, except that the non-metal source is sodium tellurate and 2 wt. % SnTe$_2$ is obtained in step 6.1, the other steps are the same as those of example 1, giving a doped and modified phosphorus-carbon composite negative electrode material (P-CNT@SnTe$_2$).

Example 7

Its procedure is similar to example 1, except that the non-metal source is sodium selenite, the metal source is nickel nitrate hexahydrate, and 2 wt. % NiSe is obtained in step 6.1, the other steps are the same as those of example 1, giving a doped and modified phosphorus-carbon composite negative electrode material (P-CNT@NiSe).

Example 8

Its procedure is similar to example 1, modify the carbon nanotubes (CNT) through amination to give an aminated modified carbon nanosphere/red phosphorus/phosphorus-carbon composite material ($NH_3$—P-CNT@$SnS_2$).

Example 9

Its procedure is similar to example 1, modify the carbon nanospheres through carboxylation to give a graphited modified carbon nanosphere/red phosphorus/phosphorus-carbon composite material (COOH—P-CNT@$SnS_2$).

Example 10

Its procedure is similar to example 1, modify the carbon nanospheres through phosphorization to give a phosphorized modified carbon nanosphere/red phosphorus/phosphorus-carbon composite material (P-P-CNT @$SnS_2$).

The cycling stability of the materials prepared in each example and each control is determined by way of testing capacity retention rates after 150 cycles, due to the low deposition overpotential of $Li^+$ on titanium, lithium is more easily immersed inside the carbon nanosphere, forming a denser and fuller phosphorus-carbon composite microsphere, which raises the utilization rate of lithium during a first charging-discharging process, and then enhances the specific capacity and cycling performance of the phosphorus-carbon composite electrode Table 1 shows the details

TABLE 1

The cycling stability of the materials prepared in each example and each control

| Example | first discharge specific capacity (mA · h · $g^{-1}$) | discharge specific capacity after 150 cycles (mA · h · $g^{-1}$) |
|---|---|---|
| Example 1 | 3020 | 2565 |
| Example 2 | 3200 | 2170 |
| Example 3 | 3250 | 2295 |
| Example 4 | 3280 | 2090 |
| Example 5 | 3220 | 1810 |
| Example 6 | 3278 | 1770 |
| Example 7 | 3325 | 1790 |
| Example 8 | 3310 | 1810 |
| Example 9 | 3220 | 1820 |
| Example 10 | 3180 | 1780 |
| Example 11 | 2130 | 1080 |
| Example 12 | 2320 | 1175 |

Example 11 involves a phosphorus-carbon negative electrode that is not modified with $SnS_2$ in Example 1.

Example 12 involves a $SnS_2$ phosphorus-carbon negative electrode that is not modified with $SnS_2$ in Example 8.

It should be understood that the above examples are only used to explain the technical conception and characteristics of the present disclosure, so as to enable people familiar with the art to understand the contents of the present disclosure and implement it accordingly, but not pose any limitations on the scope protection of the present disclosure. Any equivalent changes or modifications made in accordance with the essence of the present disclosure shall fall within the protection scope of the present disclosure.

What is claimed is:

1. A phosphorus-carbon composite negative electrode material, comprising red phosphorus and a composite carbon nanosphere with a three dimension skeleton structure wherein,
   the red phosphorus are in a form of a 60-100 mesh powder or a 10-20 mesh microsphere particles, and uniformly compounded with the composite carbon nanosphere;
   inside of the composite carbon nanosphere is embedded with a transition metal compound, a melting point of the transition metal compound is less than 200° C.;
   the transition metal compound is a reaction product of a metal source and a non-metal source, and
   the metal source is selected from the group consisting of fluoride, chloride, nitrate, sulfate and carbonate of tin, titanium, cadmium, iron, cobalt chromium, manganese, germanium or nickel, the non-metal source is one or more selected from the group consisting of sulfide, selenide, telluride and phosphide.

2. The phosphorus-carbon composite negative electrode material according to claim 1, wherein a mass ratio of said red phosphorus to said composite carbon nanosphere is 1:1-3:1.

3. The phosphorus-carbon composite negative electrode material according to claim 2, wherein said red phosphorus and said composite carbon nanosphere are mixed in a solvent and experience a thermal reaction to give a product, a mass concentration of said composite carbon nanosphere in the solution is 10%-20%.

4. The phosphorus-carbon composite negative electrode material according to claim 3, wherein said solvent in the thermal reaction comprises at least one of deionized water, absolute ethanol, anhydrous methanol and anhydrous ether.

5. The phosphorus-carbon composite negative electrode material according to claim 4, wherein a mass concentration of said transition metal compound is 0.2-3%.

6. The phosphorus-carbon composite negative electrode material according to claim 5, wherein a molar ratio of said non-metal source to said metal source is 1:1-3:1.

7. The phosphorus-carbon composite negative electrode material according to claim 6, wherein
   said sulfide comprises at least one of sublimated sulfur, thioacetamide and thiourea;
   said selenide comprises at least one of elemental selenium powder and sodium selenite;
   said telluride comprises at least one of elemental tellurium powder and sodium tellurate;
   said phosphide comprises at least one of sodium hypophosphite, phosphoric acid, ammonium dihydrogen phosphate and diammonium hydrogen phosphate.

8. The phosphorus-carbon composite negative electrode material according to claim 5, wherein said carbon nanosphere may be a material different in particle sizes and skeleton structures obtained through any one or more of surface modification processes of amination, carboxylation, hydroxylation, phosphorization and graphitization.

9. A negative electrode material of a lithium-ion battery including the phosphorus-carbon composite negative electrode material according to claim 1.

* * * * *